United States Patent
Shibata et al.

(10) Patent No.: US 10,859,224 B2
(45) Date of Patent: Dec. 8, 2020

(54) LIGHTING DEVICE

(71) Applicant: KOITO MANUFACTURING CO., LTD., Tokyo (JP)

(72) Inventors: Hiroki Shibata, Shizuoka (JP); Yoshihide Noda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/539,507

(22) PCT Filed: Dec. 21, 2015

(86) PCT No.: PCT/JP2015/085673
§ 371 (c)(1),
(2) Date: Jun. 23, 2017

(87) PCT Pub. No.: WO2016/104426
PCT Pub. Date: Jun. 30, 2016

(65) Prior Publication Data
US 2017/0350567 A1 Dec. 7, 2017

(30) Foreign Application Priority Data

Dec. 25, 2014 (JP) .................. 2014-262574
Dec. 25, 2014 (JP) .................. 2014-262586
Jun. 10, 2015 (JP) .................. 2015-117733

(51) Int. Cl.
B60Q 1/20 (2006.01)
F21S 8/00 (2006.01)
(Continued)

(52) U.S. Cl.
CPC .......... F21S 41/143 (2018.01); B60Q 1/0683 (2013.01); B60Q 1/20 (2013.01);
(Continued)

(58) Field of Classification Search
CPC ........ F21S 41/192; F21S 41/25; F21S 41/295; F21S 41/635; F21S 41/143; F21S 41/00;
(Continued)

(56) References Cited

U.S. PATENT DOCUMENTS 5,546,283 A * 8/1996 Ohtsuka ............... B60Q 1/0683
362/528
6,186,651 B1 * 2/2001 Sayers .................. F21S 41/689
362/512
(Continued)

FOREIGN PATENT DOCUMENTS

CN      1264808 A    8/2000
CN    201053613 Y   4/2008
(Continued)

OTHER PUBLICATIONS

International Search Report issued in corresponding application No. PCT/JP2015/085673 dated Apr. 5, 2016 (9 pages).
(Continued)

Primary Examiner — Arman B Fallahkhair
(74) Attorney, Agent, or Firm — Osha Bergman Watanabe & Burton LLP

(57) ABSTRACT

A substrate supports a light source and a control circuit. The control circuit is configured to be able to control lighting and lights-out of the light source. The substrate is supported to a conductive housing. The housing is configured to couple with a transparent cover through which light emitted from the light source is to pass. The housing has a through-hole. A connector unit has a connection part and a terminal holding part. The connection part is arranged outside the housing. At least a part of the insulating terminal holding part is arranged in the through hole. The terminal holding
(Continued)

part holds a conductive terminal. The conductive terminal is coupled to the substrate and electrically connected to the control circuit.

9 Claims, 29 Drawing Sheets

(51) Int. Cl.

| | | |
|---|---|---|
| F21S 41/143 | (2018.01) | |
| F21S 41/00 | (2018.01) | |
| B60Q 1/068 | (2006.01) | |
| F21S 41/29 | (2018.01) | |
| F21S 41/16 | (2018.01) | |
| F21S 41/151 | (2018.01) | |
| F21S 45/48 | (2018.01) | |
| F21S 41/25 | (2018.01) | |
| F21S 41/63 | (2018.01) | |
| F21S 41/19 | (2018.01) | |
| F21Y 115/10 | (2016.01) | |
| F21W 102/30 | (2018.01) | |
| F21S 45/50 | (2018.01) | |
| F21Y 103/10 | (2016.01) | |
| B60Q 1/00 | (2006.01) | |
| F21S 41/32 | (2018.01) | |

(52) U.S. Cl.
CPC ............. *F21S 41/00* (2018.01); *F21S 41/151* (2018.01); *F21S 41/16* (2018.01); *F21S 41/192* (2018.01); *F21S 41/25* (2018.01); *F21S 41/295* (2018.01); *F21S 41/635* (2018.01); *F21S 45/48* (2018.01); *B60Q 1/0088* (2013.01); *F21S 41/32* (2018.01); *F21S 45/50* (2018.01); *F21W 2102/30* (2018.01); *F21Y 2103/10* (2016.08); *F21Y 2115/10* (2016.08)

(58) Field of Classification Search
CPC .. F21S 43/00; F21S 45/47; F21S 41/32; F21S 45/50; F21S 48/211; F21S 48/212; F21S 48/215; F21S 4/2206; F21S 48/2212; B60Q 1/0433; B60Q 1/0683; B60Q 1/20; B60Q 1/2623; B60Q 1/263; B60Q 1/2638; B60Q 1/56
USPC .......................................................... 362/512
See application file for complete search history.

(56) References Cited

U.S. PATENT DOCUMENTS

| | | | |
|---|---|---|---|
| 6,309,089 B1 | 10/2001 | Yoneyama et al. | |
| 6,637,919 B2* | 10/2003 | Shirai | B60Q 1/0683 362/515 |
| 7,153,008 B2* | 12/2006 | Grote | B60Q 1/2696 362/487 |
| 7,753,575 B2* | 7/2010 | Mochizuki | B60Q 1/076 362/545 |
| 8,231,254 B2* | 7/2012 | Beck | F21K 9/00 362/523 |
| 8,585,265 B2* | 11/2013 | Shibata | B60Q 1/0683 362/512 |
| 8,845,161 B2* | 9/2014 | DiPenti | F21V 23/02 362/545 |
| 9,174,689 B2* | 11/2015 | Owada | B60Q 1/0088 |
| 9,206,954 B2* | 12/2015 | Aiso | F21S 41/143 |
| 9,664,353 B2* | 5/2017 | Maliar | F21S 41/143 |
| 9,908,459 B2* | 3/2018 | Wu | B60Q 1/20 |
| 9,939,122 B2* | 4/2018 | Okubo | F21S 41/19 |
| 2010/0128479 A1 | 5/2010 | Biebl et al. | |
| 2011/0128754 A1* | 6/2011 | Aiso | F21S 41/143 362/547 |
| 2012/0044711 A1 | 2/2012 | Konishi et al. | |
| 2012/0140505 A1* | 6/2012 | Tsukamoto | F21S 41/151 362/520 |
| 2012/0201039 A1* | 8/2012 | Shibata | B60Q 1/0683 362/460 |
| 2013/0141930 A1 | 6/2013 | Inaba | |
| 2013/0250601 A1 | 9/2013 | Ito | |
| 2013/0252472 A1 | 9/2013 | Watanabe et al. | |
| 2014/0022806 A1 | 1/2014 | Shibata | |
| 2014/0321132 A1 | 10/2014 | Shibata et al. | |
| 2014/0355286 A1 | 12/2014 | Arita | |
| 2014/0368892 A1 | 12/2014 | Mizoguchi | |
| 2015/0184819 A1 | 7/2015 | Maliar et al. | |
| 2016/0320011 A1 | 11/2016 | Arita | |

FOREIGN PATENT DOCUMENTS

| | | |
|---|---|---|
| CN | 102470790 A | 5/2012 |
| CN | 104121532 A | 10/2014 |
| CN | 104238109 A | 12/2014 |
| JP | H03-101805 U | 10/1991 |
| JP | 2010-524210 A | 7/2010 |
| JP | 2011-108570 A | 6/2011 |
| JP | 2013-118148 A | 6/2013 |
| JP | 2013-200973 A | 10/2013 |
| JP | 2013-229276 A | 11/2013 |
| JP | 2014-022200 A | 2/2014 |
| JP | 2014-216253 A | 11/2014 |
| JP | 2014-235878 A | 12/2014 |
| KR | 20140036528 A | 3/2014 |
| WO | 2014/012878 A1 | 1/2014 |

OTHER PUBLICATIONS

Written Opinion of the International Searching Authority issued in corresponding application No. PCT/JP2015/085673 dated Apr. 5, 2016 (9 pages).
Office Action issued in Chinese Application No. 201580070788.6, dated Jan. 22, 2019 (19 pages).
Office Action issued in corresponding Chinese Application No. 201810155184.7; dated Mar. 30, 2020 (23 pages).

* cited by examiner

LIGHTING DEVICE

CROSS-REFERENCE TO RELATED APPLICATIONS

The present application claims priority to Japanese Patent Application No. 2014-262574 filed on Dec. 25, 2014, Japanese Patent Application No. 2014-262586 filed on Dec. 25, 2014 and Japanese Patent Application No. 2015-117733 filed on Jun. 10, 2015, the subject matter of which are herein incorporated by reference in their entirety.

BACKGROUND

Technical Field

The present invention relates to a lighting device that is to be mounted on a vehicle.

Related Art

Patent Document 1 discloses an example of the lighting device. According to the lighting device disclosed in Patent Document 1, in order to feed power to a light source in a lamp chamber defined by a housing and a transparent cover, a connector that is to be connected to an external power source is arranged outside the housing.

Patent Document 2 discloses another example of the lighting device. The lighting device disclosed in Patent Document 2 is a fog lamp where a light source and a projection lens are accommodated in a lamp chamber defined by a housing and a transparent cover. Light emitted from the light source passes through the projection lens and forms a predetermined light distribution pattern in front of a vehicle under predetermined light distribution control.

CITATION LIST

Patent Documents

Patent Document 1: Japanese Patent Application Publication No. 2013-118148A
Patent Document 2: Japanese Patent Application Publication No. 2011-108570A

SUMMARY

One or more embodiments of the present invention achieves miniaturization of a lighting device that is to be mounted on a vehicle.

According to a first aspect of the present invention, a lighting device that is to be mounted on a vehicle is provided. The lighting device includes:
a light source,
a control circuit configured to be able to control lighting and lights-out of the light source,
a substrate configured to support the light source and the control circuit,
a conductive housing configured to couple with a transparent cover, through which light emitted from the light source is to pass, and to support the substrate and having a through-hole,
a power feeding connector having a first part arranged outside the housing and an insulating second part of which at least a part is arranged in the through-hole, and
a conductive terminal held at the second part, coupled to the substrate and electrically connected to the control circuit.

In the above configuration, the substrate is configured to support both the light source and the control circuit. According to a general technical approach, a member configured to support the light source and a member configured to support the control circuit are separately provided so as to protect the control circuit from the light source that is to generate heat in association with light emission. However, in the above configuration, the conductive housing is configured to support the substrate. In general, a conductive material has relatively high thermal conductivity. Also, the housing can secure a large heat radiation area because it is coupled with the transparent cover through which the light emitted from the light source is to pass. In other words, the housing itself can be used as a heat sink. Therefore, the light source and the control circuit share the substrate, so that it is possible to effectively dissipate the heat generated from the light source while meeting the need for miniaturization of the lighting device.

Also, in the above configuration, the power feeding connector has the first part and the second part. The first part is arranged outside the housing. At least a part of the second part is insulating and is arranged in the through-hole of the housing. The conductive terminal held at the second part is coupled to the substrate and is electrically connected to the control circuit. Thereby, it is possible to omit a wiring for electrically connecting the substrate and the power feeding connector. Therefore, also in this configuration, it is possible to meet the need for miniaturization of the lighting device that is to be mounted on the vehicle.

The lighting device may be configured as follows.
The housing is a one-piece metal member having a plurality of heat radiation plates integrally formed thereto.
The housing has a ventilation part configured to communicate with the lamp chamber.

According to the above configuration, it is possible to further improve the function of the housing as a heat sink. Therefore, it is possible to further improve the dissipation performance of heat, which is to be generated in association with the light emission of the light source, while meeting the need for miniaturization of the lighting device that is to be mounted on the vehicle. In order to improve the dissipation performance of heat, it is preferably to provide more heat radiation plates. Even though each heat radiation plate becomes thinner as more heat radiation plates are formed in a limited area for miniaturization, since the housing is metallic one-piece member, it is possible to secure stiffness of each heat radiation plate. Therefore, it is possible to suppress a possibility that a heat radiation structure is to be deformed or damaged due to an external force, in addition to the above-described effects.

The lighting device may be configured as follows.
A part of the power feeding connector is mechanically fastened to the substrate.

According to the above configuration, the power feeding connector is firmly supported by the substrate. Thereby, it is possible to protect the coupling between the conductive terminal and the substrate from an external force that is to be applied to the second part when the second part of the power feeding connector is arranged in the through-hole of the housing, for example. Therefore, it is possible to improve the connection reliability between the conductive terminal and the control circuit while meeting the need for miniaturization of the lighting device that is to be mounted on the vehicle.

The lighting device may be configured as follows.

The light device includes a sealing member arranged between the second part and an inner wall of the through-hole.

According to the above configuration, a gap formed between the second part and the inner wall of the through-hole is sealed by the sealing member. Thereby, it is possible to prevent moisture and dust from being introduced into the lamp chamber through the through-hole. Therefore, it is possible to protect the configuration in the lamp chamber from the moisture and dust while meeting the need for miniaturization of the lighting device that is to be mounted on the vehicle.

The lighting device may be configured as follows.

The inner wall of the through-hole is inclined relative to a direction in which the through-hole extends.

According to the above configuration, it is possible to easily demold a mold that is to be used upon molding of the housing. Thereby, a yield is improved, which contributes to the saving of manufacturing cost. Therefore, it is possible to suppress the manufacturing cost while meeting the need for miniaturization of the lighting device that is to be mounted on the vehicle. In particular, the sealing member is used together, so that dimension precision to be required for a shape of the second part facing the inclined inner wall of the through-hole is relaxed and thus the manufacturing cost can be further suppressed.

The lighting device may be configured as follows.

The light device includes:

a projection lens configured to enable at least a part of the light emitted from the light source to pass therethrough, a holder configured to hold the projection lens, a position of the holder relative to the light source being fixed, a shaft part provided for one of the projection lens and the holder and extending in a direction intersecting with an optical axis of the projection lens, a shaft holding part provided for the other of the projection lens and the holder and configured to rotatably hold the shaft part, and an adjustment mechanism configured to rotate the projection lens relative to the holder about the shaft part.

According to the above configuration, it is possible to adjust a reference position of the optical axis of the projection lens by directly rotating the projection lens held at the holder. Since the projection lens is a smaller and lighter component than the housing, it is possible to effectively change a posture of the projection lens while avoiding enlargement of a mechanism relating to the optical axis adjustment. Therefore, it is possible to meet the need for miniaturization of the lighting device that is to be mounted on the vehicle while providing the projection lens and the mechanism configured to adjust the optical axis of the projection lens.

In this case, the lighting device may be configured as follows.

The adjustment mechanism includes:

a screw of which a part is configured to be rotatably operated outside the housing, and a joint configured to convert rotation of the screw into a force for rotating the projection lens about the shaft part.

The screw extends through a part of the housing.

According to the above configuration, it is possible to arrange the adjustment mechanism while effectively using an empty space in the lamp chamber defined by the housing. Therefore, it is possible to further meet the need for miniaturization of the lighting device that is to be mounted on the vehicle while providing the projection lens and the mechanism configured to adjust the optical axis of the projection lens.

According to a second aspect of the present invention, a lighting device that is to be mounted on a vehicle is provided. The lighting device includes:

a light source, a projection lens, a first support member configured to support the projection lens, a second support member configured to support the first support member, a housing configured to define a part of a lamp chamber for accommodating therein the light source, the projection lens, the first support member and the second support member, a reflector provided for the first support member and configured to reflect light emitted from the light source towards the projection lens, a shaft part provided for one of the first support member and the second support member and extending in a direction intersecting with an optical axis of the projection lens, a shaft holding part provided for the other of the first support member and the second support member and configured to rotatably hold the shaft part, and an adjustment mechanism configured to rotate the first support member relative to the second support member about the shaft part.

According to a configuration where the projection lens is provided in the lamp chamber, an error may occur from a predetermined specification as to a reference position of the optical axis of the projection lens, due to an error upon assembling of a product or inequality of mounting precision to the vehicle. In this case, since a desired light distribution pattern may not be obtained, there is a need for providing an adjustment mechanism for solving the error. However, when the adjustment mechanism is additionally provided, the enlargement of the lighting device is inevitably caused.

In order to change the reference position of the optical axis of the projection lens, it is required to finally change a position or a posture of the projection lens. It is considered how to arrange a mechanism enabling the change. For example, a configuration of changing a posture of the housing defining the lamp chamber is considered. The inventors conceived a configuration where the shaft part is provided for one of the projection lens and a member configured to support the projection lens, the shaft holding part configured to allow the shaft part to rotate is provided for the other, and the projection lens is rotated by operating the adjustment mechanism. Since the projection lens is a smaller and lighter component than the housing, it is possible to effectively change a posture of the projection lens while avoiding enlargement of a mechanism relating to the optical axis adjustment.

In this case, however, as the projection lens is rotated, a relative position between the optical axis of the projection lens and the reflector is changed. The inventors found out that the change in the relative position between the optical axis of the projection lens and the reflector may cause a distortion at a peripheral edge portion of a light distribution pattern to be formed.

As a result of an intensive study, the inventors conceived a configuration where the shaft part is provided for one of the first support member configured to support the projection lens and the second support member configured to support the first support member, the shaft holding part configured to allow the shaft part to rotate is provided for the other, and the reflector is provided for the first support member. A member to rotate is the first support member configured to support the projection lens, which is a smaller and lighter component than the housing. Therefore, also in this configuration, it is possible to continuously suppress enlargement of a mechanism for implementing the rotation. Thereby, it is possible to suppress the enlargement of the lighting device while providing the projection lens and the adjustment mechanism configured to adjust the optical axis of the projection lens. Also, since the reflector is displaced to follow displacement of the optical axis of the projection lens by the adjustment mechanism, the relative position between the reflector and the optical axis is not changed. Therefore, it is possible to suppress a distortion of the light distribution pattern to be formed.

The lighting device may be configured as follows.

The adjustment mechanism includes:

a screw of which a part is configured to be rotatably operated outside the housing, and a joint configured to convert rotation of the screw into a force for rotating the first support member about the shaft part.

In this case, the lighting device may be configured as follows.

The joint is integrally formed with the first support member.

According to the above configuration, it is possible not only to suppress the enlargement of the lighting device but also to reduce the number of components. When the first support member and the joint are configured as separate members, it is possible not only to suppress the enlargement of the lighting device but also to improve the forming easiness of each member.

The lighting device may be configured to include a circuit board including a circuit configured to control lighting and lights-out of the light source.

In this case, the lighting device may be configured as follows.

The screw extends through a part of the housing.

At least a part of the circuit board is arranged in a space in which the screw extends in the lamp chamber.

According to the above configuration, it is possible to suppress the enlargement of the housing by effectively utilizing the space that is required as the screw is provided. Therefore, it is possible to further suppress the enlargement of the lighting device while providing the projection lens and the adjustment mechanism configured to adjust the optical axis of the projection lens.

In this case, the lighting device may be configured as follows.

The screw extends in a front and rear direction of the vehicle.

The circuit board is preferably arranged so that at least a part of a main surface thereof is to face the screw.

According to the above configuration, it is possible to particularly reduce a size of the housing in an upper and lower direction and in a right and left direction. In general, it is strongly needed to miniaturize the lighting device in the upper and lower direction, rather than in the front and rear direction. Therefore, it is possible to meet the need for miniaturization while providing the projection lens and the adjustment mechanism configured to adjust the optical axis of the projection lens.

The lighting device may be configured as follows.

A light output surface of the light source is configured to face the projection lens.

According to the above configuration, it is possible to shorten a distance between the light source and the projection lens. Therefore, it is possible to further suppress the enlargement of the lighting device while providing the projection lens and the adjustment mechanism configured to adjust the optical axis of the projection lens.

The lighting device may be configured as follows.

The shaft part has a first shaft part and a second shaft part.

The shaft holding part has a first shaft holding part configured to hold the first shaft part and a second shaft holding part configured to hold the second shaft part.

In at least one of a first combination of the first shaft part and the first shaft holding part and a second combination of the second shaft part and the second holding part, at least one of the shaft part and the shaft holding part configuring the corresponding combination is arranged inside an outward shape of the projection lens, when the projection lens is seen from a direction along the optical axis.

According to the above configuration, it is possible to further suppress the enlargement of the lighting device in a direction along a center line of rotation of the shaft part.

DETAILED DESCRIPTION

Hereinafter, embodiments of the present invention will be described in detail with reference to the accompanying drawings. In the respective drawings that are to be used for the below descriptions, a scale is appropriately changed so as to depict each member in a recognizable size. "Right" and "left" in the descriptions indicate a right and left direction as seen from a driver seat. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
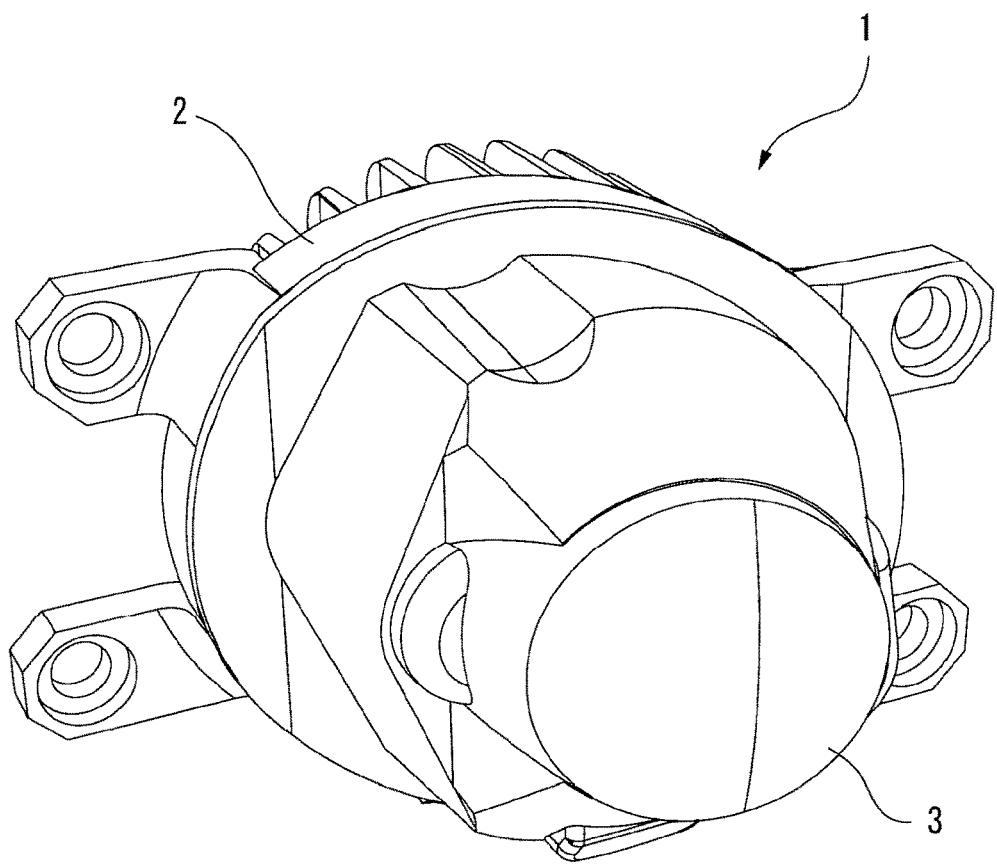
FIG. 1 is a perspective view depicting a fog lamp in accordance with a first embodiment.
Figure 1:
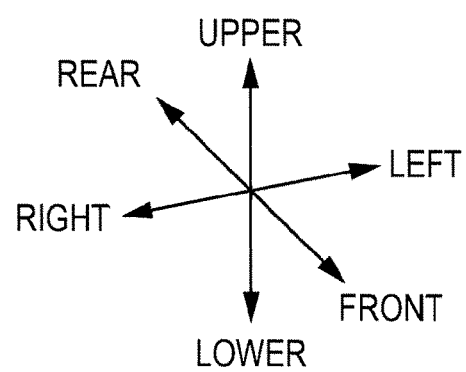
Figure 2:
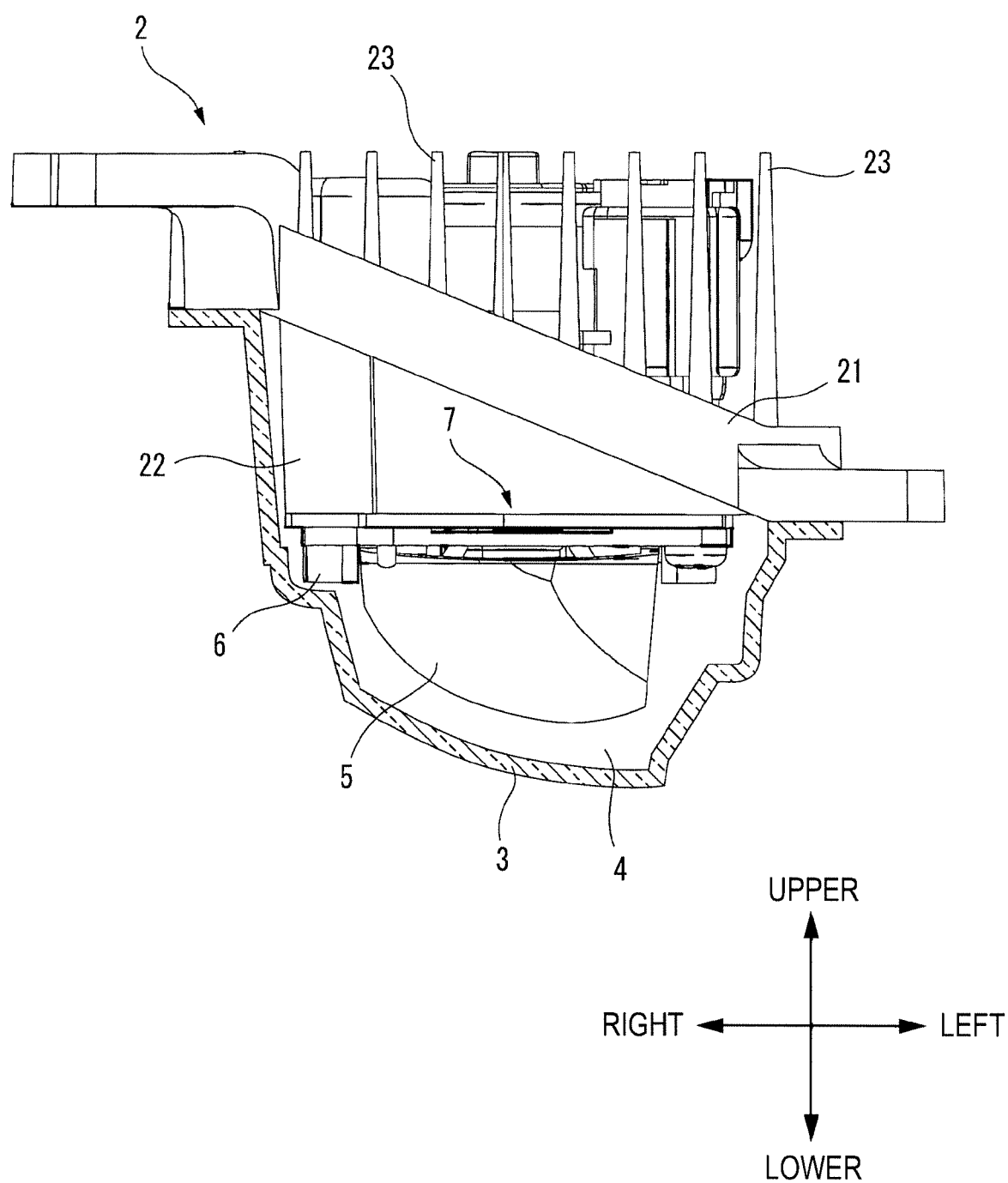
FIG. 2 is a plan view depicting the fog lamp of FIG. 1, in a form of a partial sectional view.

FIG. 1 is a perspective view depicting an outward appearance of a fog lamp 1 (an example of the lighting device) in accordance with an embodiment, as seen from a right front top side. The fog lamp 1 includes a housing 2 and a transparent cover 3. FIG. 2 depicts the fog lamp 1 as seen from above, in which only the transparent cover 3 is shown in a sectional view. The transparent cover 3 is mounted to the housing 2 and defines a lamp chamber 4. In other words, the housing 2 is configured to couple with the transparent cover 3 and to define the lamp chamber 4. Herein, "coupling" indicates a meaning including engaging, fitting, bonding, welding and the like.

The housing 2 is formed of metal. That is, the housing 2 is conductive. The housing 2 includes a back plate 21 and a support table 22. The back plate 21 has a circular plate shape so as to minimize an occupying area upon mounting to a vehicle. The support table 22 is provided at the front of the back plate 21 and is accommodated in the lamp chamber 4.

The fog lamp 1 includes a projection lens 5, a lens holder 6 and a light source unit 7. The projection lens 5, the lens holder 6 and the light source unit 7 are accommodated in the lamp chamber 4.

Figure 3:
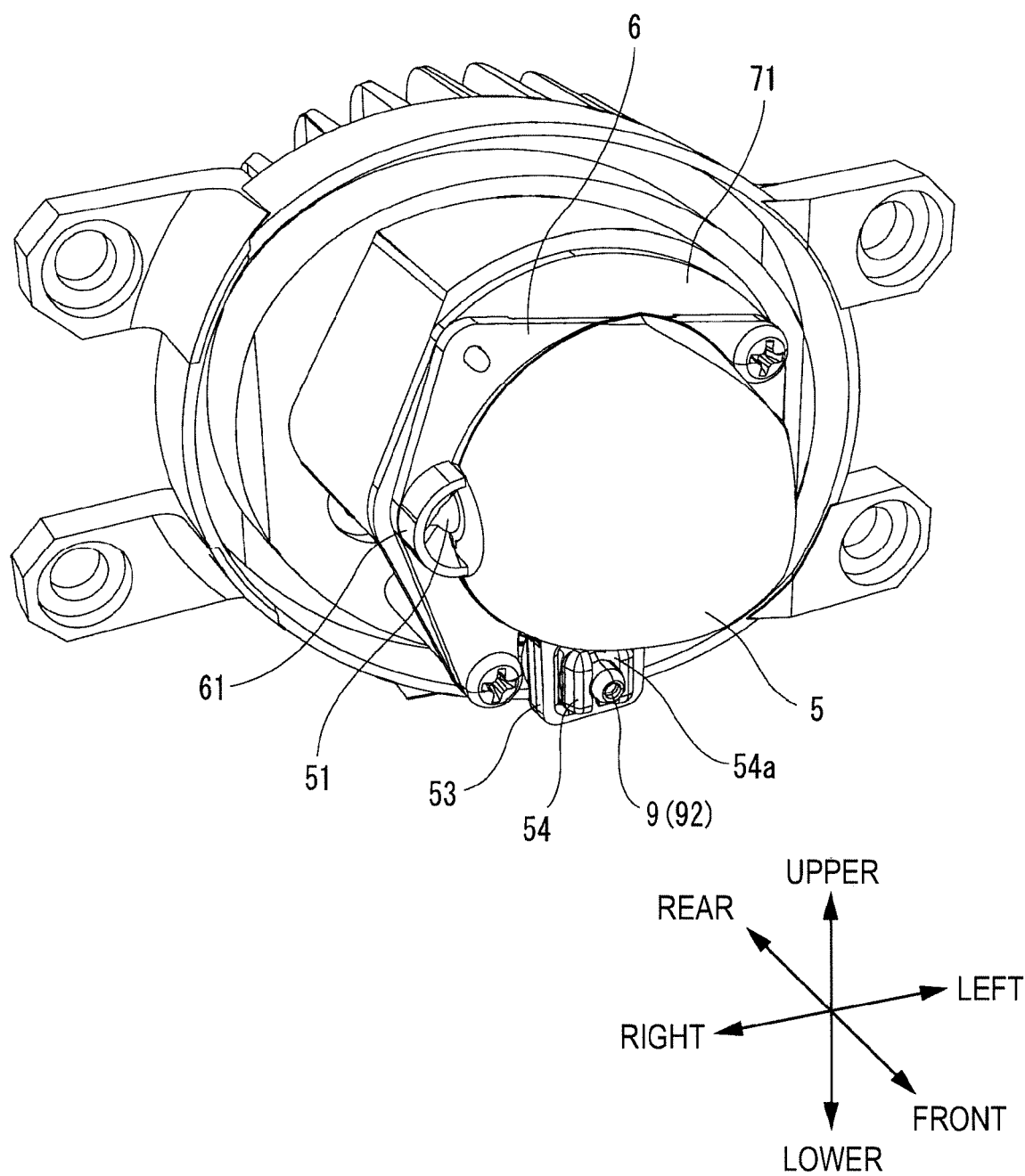
FIG. 3 is a perspective view depicting a part of the fog lamp of FIG. 1.
Figure 4:
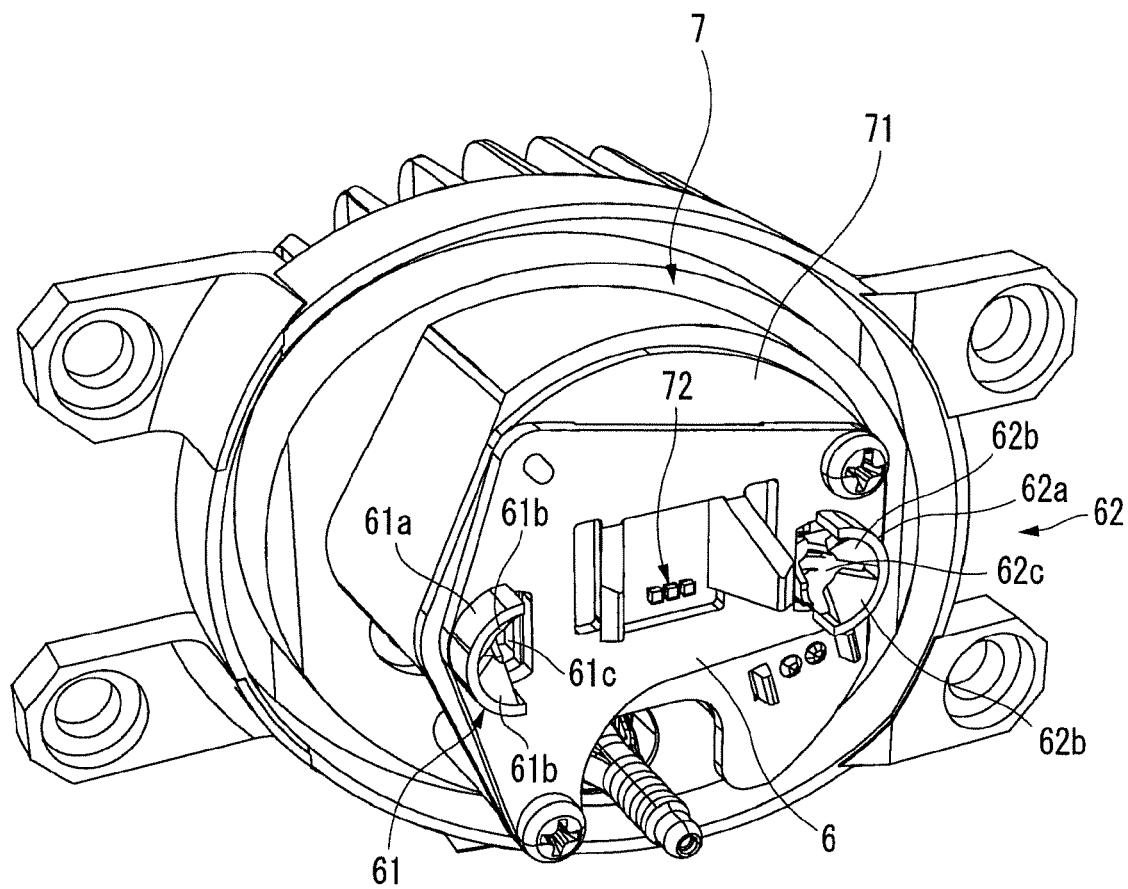
FIG. 4 is a perspective view depicting a part of the fog lamp of FIG. 1.
Figure 4:
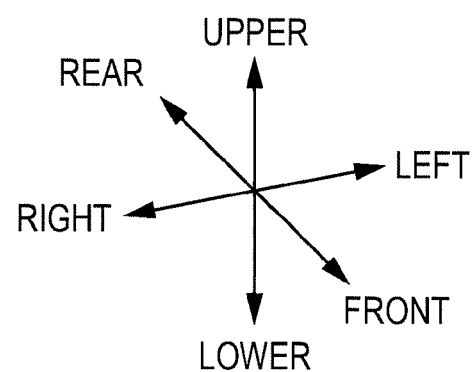

FIG. 3 is a perspective view depicting a part of the fog lamp 1 as seen from a right front top side, in which the transparent cover 3 is detached from the state shown in FIG. 1. FIG. 4 is a perspective view depicting a part of the fog lamp 1 as seen from a right front top side, in which the projection lens 5 is detached from the state shown in FIG. 3.

Figure 5:
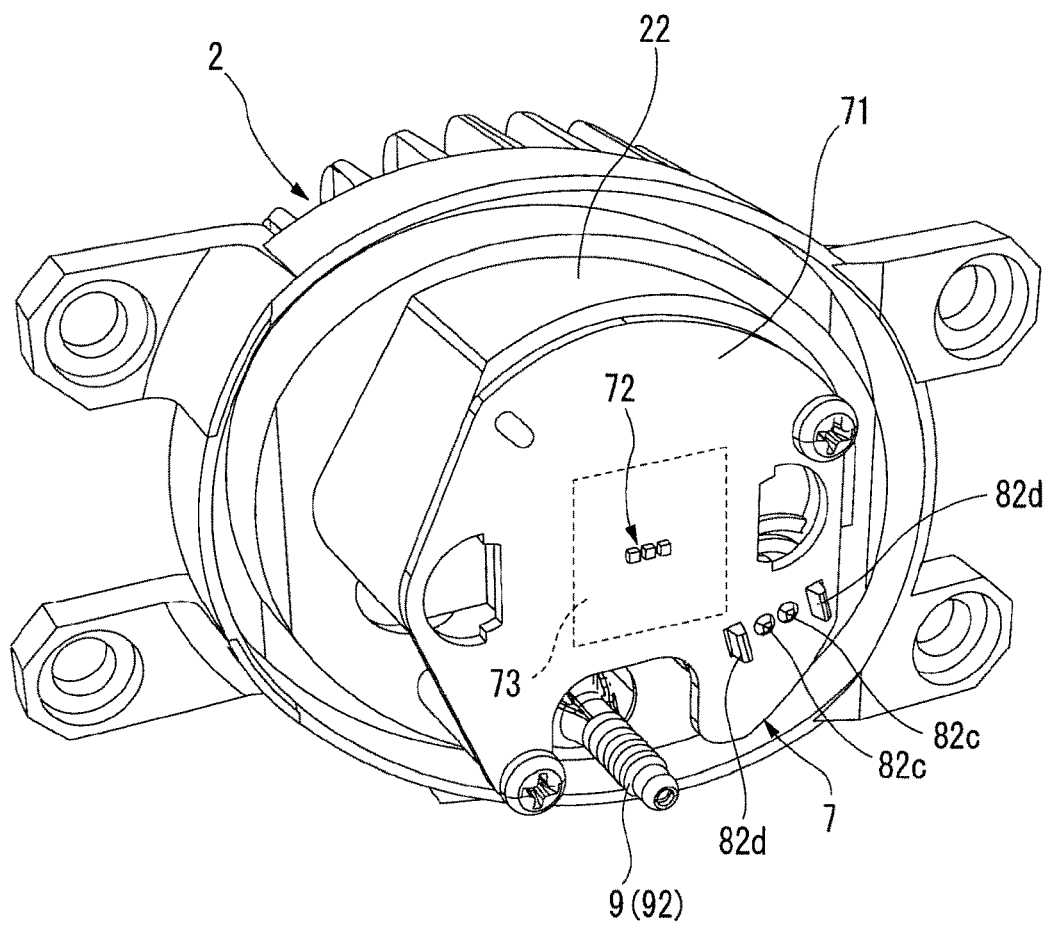
FIG. 5 is a perspective view depicting a part of the fog lamp of FIG. 1.
Figure 5:
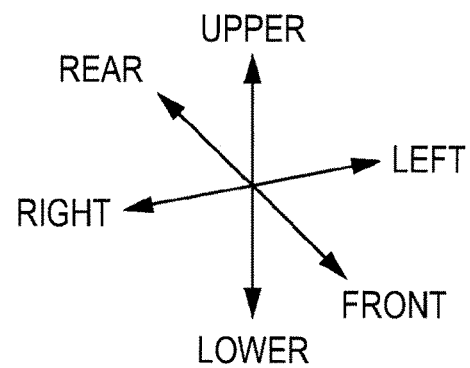

FIG. 5 is a perspective view depicting a part of the fog lamp 1 as seen from a right front top side, in which the lens holder 6 is detached from the state shown in FIG. 4.

As shown in FIG. 5, the light source unit 7 includes a substrate 71, a light source 72 and a control circuit 73. The substrate 71 is mounted to a front surface of the support table 22 of the housing 2. In other words, the housing 2 is configured to support the substrate 71. The light source 72 is arranged on a front surface of the substrate 71. The control circuit 73 is formed on the substrate 71. The control circuit 73 is configured to control lighting and lights-out of the light source 72. Specifically, the control circuit 73 includes a constant current control circuit or a constant voltage control circuit. That is, the substrate 71 is configured to support the light source 72 and the control circuit 73.

The light source 72 consists of a plurality of semiconductor light emitting elements. As the semiconductor light emitting element, a light emitting diode, a laser diode, an organic EL element and the like may be exemplified. The number of light emitting elements is appropriately determined depending on the specification. Also, as the light source 72, a lamp light source (a discharge lamp, a halogen bulb or the like) may be used.

Figure 6:
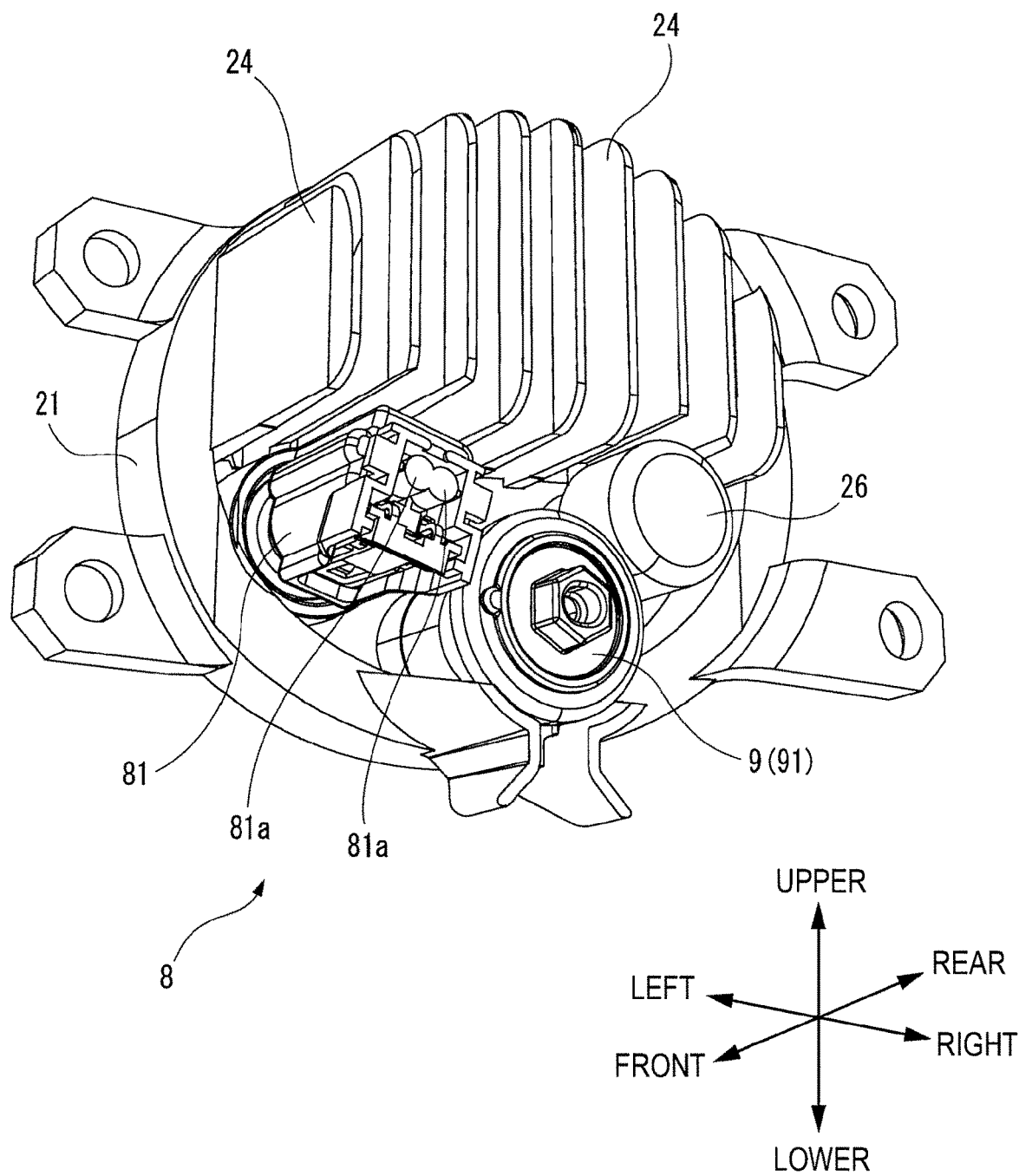
FIG. 6 is a perspective view depicting a part of the fog lamp of FIG. 1.

FIG. 6 is a perspective view depicting a part of the fog lamp 1 as seen from a left rear bottom side. The fog lamp 1 includes a connector unit 8 (an example of the power feeding connector). The connector unit 8 has a first connector housing 81. The first connector housing 81 is arranged at the rear of the back plate 21 of the housing 2. In other words, the first connector housing 81 is arranged outside the lamp chamber 4. The first connector housing 81 is formed of an insulating material. The first connector housing 81 has a pair of conductive terminals 81a. The pair of conductive terminals 81a is configured to electrically connect to an external power supply (not shown). For example, one of the pair of conductive terminals 81a is a power feeding terminal and the other is an earth terminal.

Figure 7:
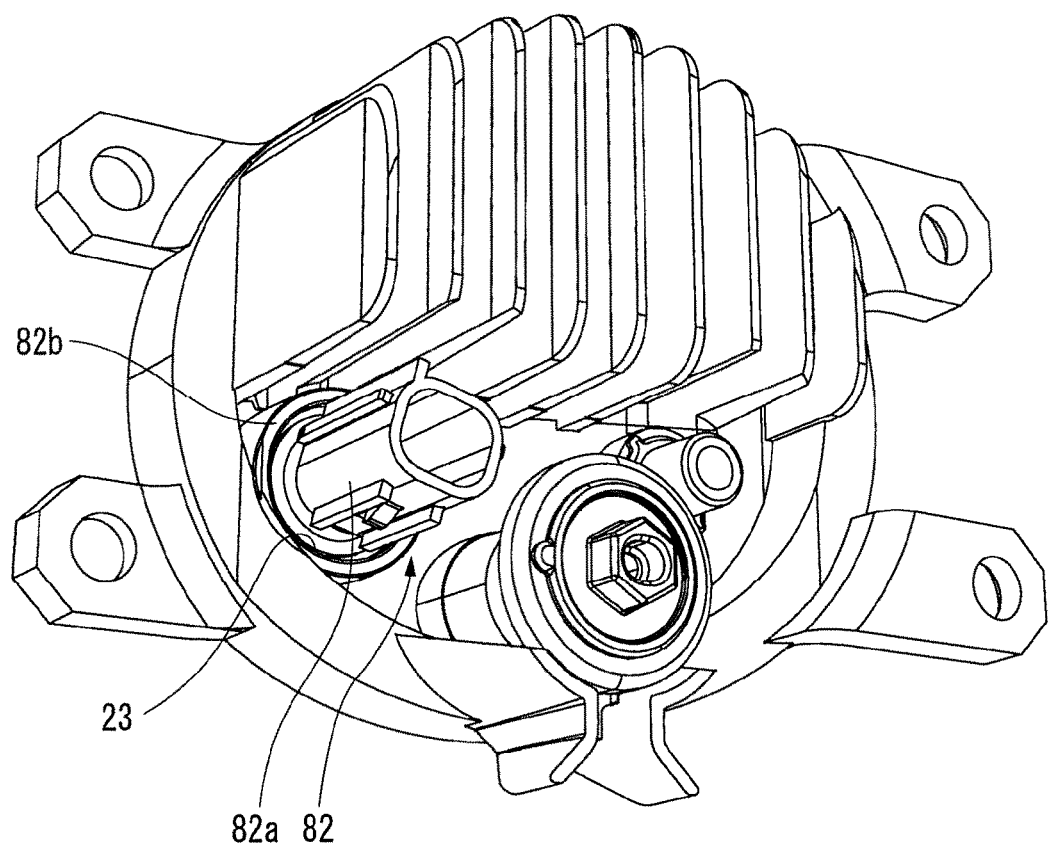
FIG. 7 is a perspective view depicting a part of the fog lamp of FIG. 1.
Figure 7:
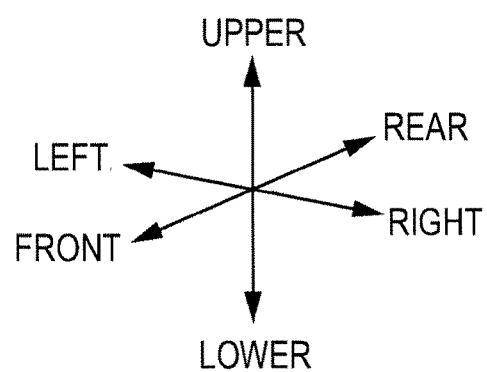
Figure 8:
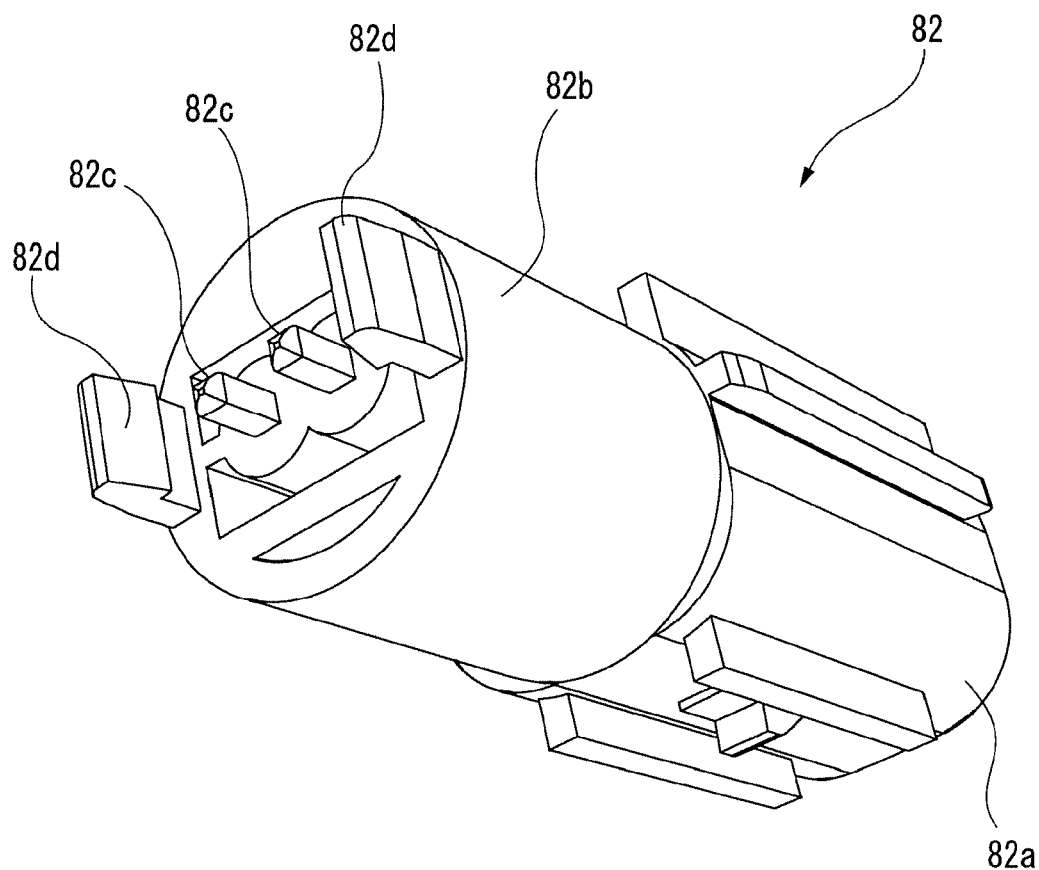
FIG. 8 is a perspective view depicting a second connector housing of the fog lamp of FIG. 1.
Figure 8:
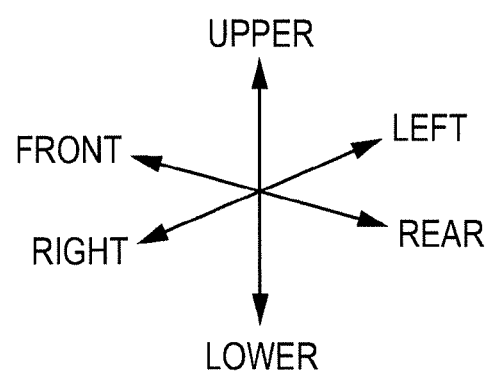

FIG. 7 is a perspective view depicting a part of the fog lamp 1 as seen from a left rear bottom side, in which the first connector housing 81 is detached from the state of FIG. 6. The connector unit 8 has a second connector housing 82. FIG. 8 is a perspective view depicting an outward appearance of the second connector housing 82 as seen from a right front bottom side. The second connector housing 82 includes a connection part 82a, a terminal holding part 82b and a pair of conductive terminals 82c. The connection part 82a and the terminal holding part 82b are formed of an insulating material. The pair of conductive terminals 82c is held at the terminal holding part 82b. For example, one of the pair of conductive terminals 82c is a power feeding terminal and the other is an earth terminal.

Figure 9:
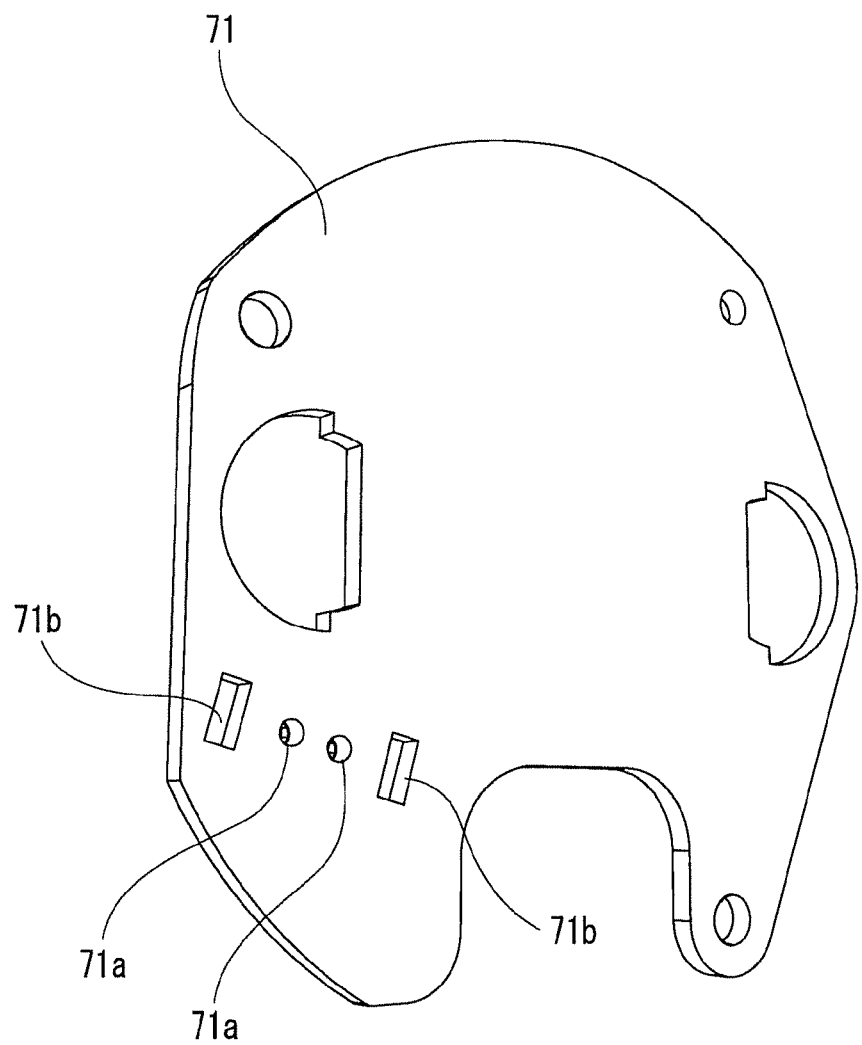
FIG. 9 is a perspective view depicting a substrate of the fog lamp of FIG. 1.
Figure 9:
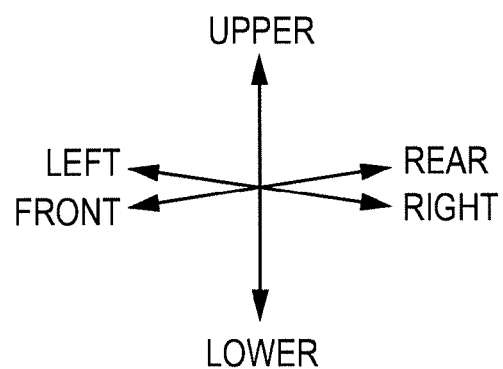
Figure 10:
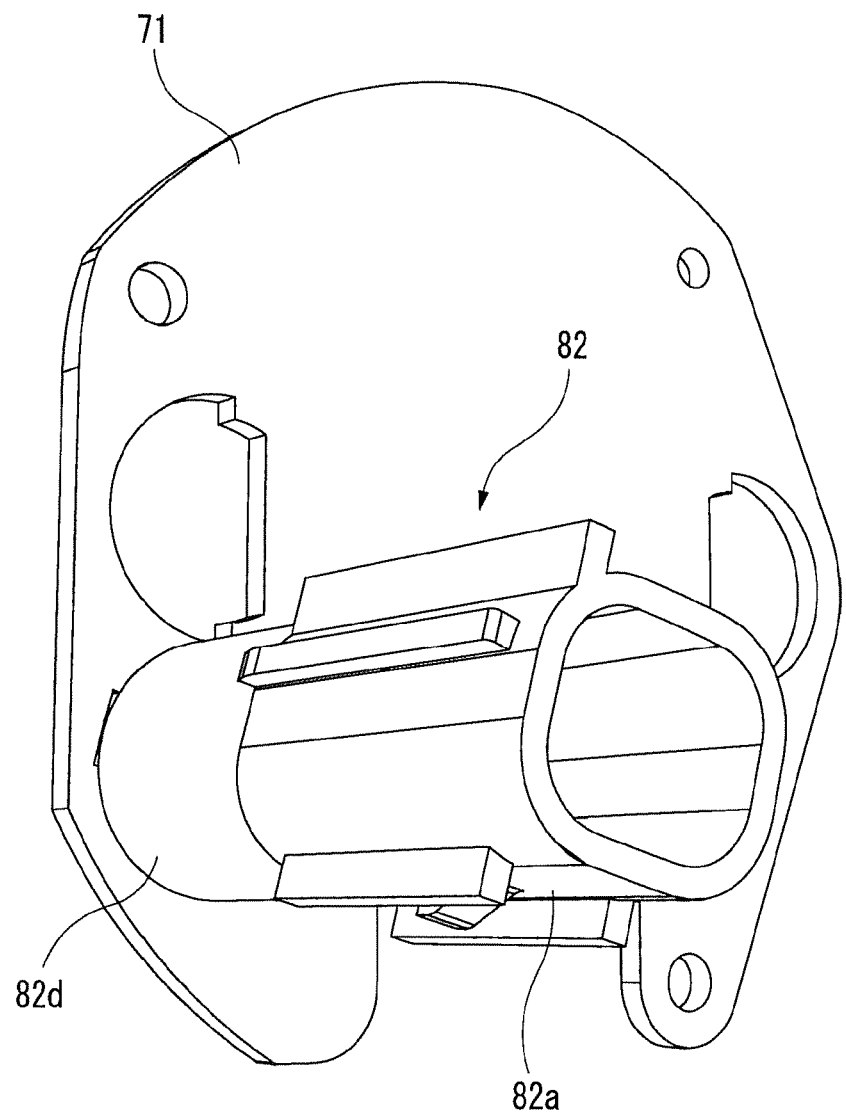
FIG. 10 is a perspective view depicting a state where the second connector housing is mounted to the substrate.
Figure 10:
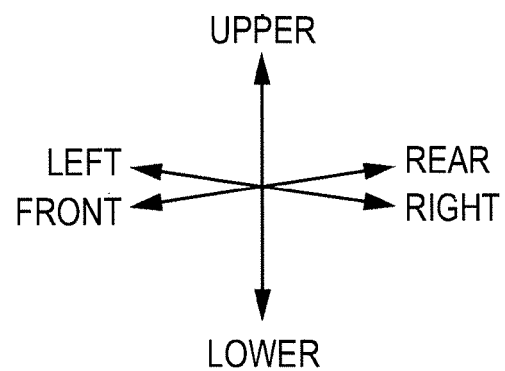

A sequence of mounting the connector unit 8 having the above configuration to the light source unit 7 is described. FIG. 9 is a perspective view depicting the substrate 71 as seen from a right rear bottom side. The substrate 71 is formed with a pair of terminal holes 71a. The pair of terminal holes 71a penetrates the substrate 71. Then, as shown in FIG. 10, the second connector housing 82 is mounted to a backside of the substrate 71. At this time, the pair of conductive terminals 82c of the second connector housing 82 is inserted into the pair of terminal holes 71a.

Thereby, as shown in FIG. 5, tip ends of the pair of conductive terminals 82c protrude from the front surface of the substrate 71. The pair of conductive terminals 82c is soldered, so that the pair of conductive terminals 82c is coupled to the substrate 71. That is, the second connector housing 82 is fixed to the substrate 71. Also, the pair of conductive terminals 82c is electrically connected to the control circuit 73. That is, the pair of conductive terminals 82c is electrically connected to the light source 72 via the control circuit 73.

Figure 11:
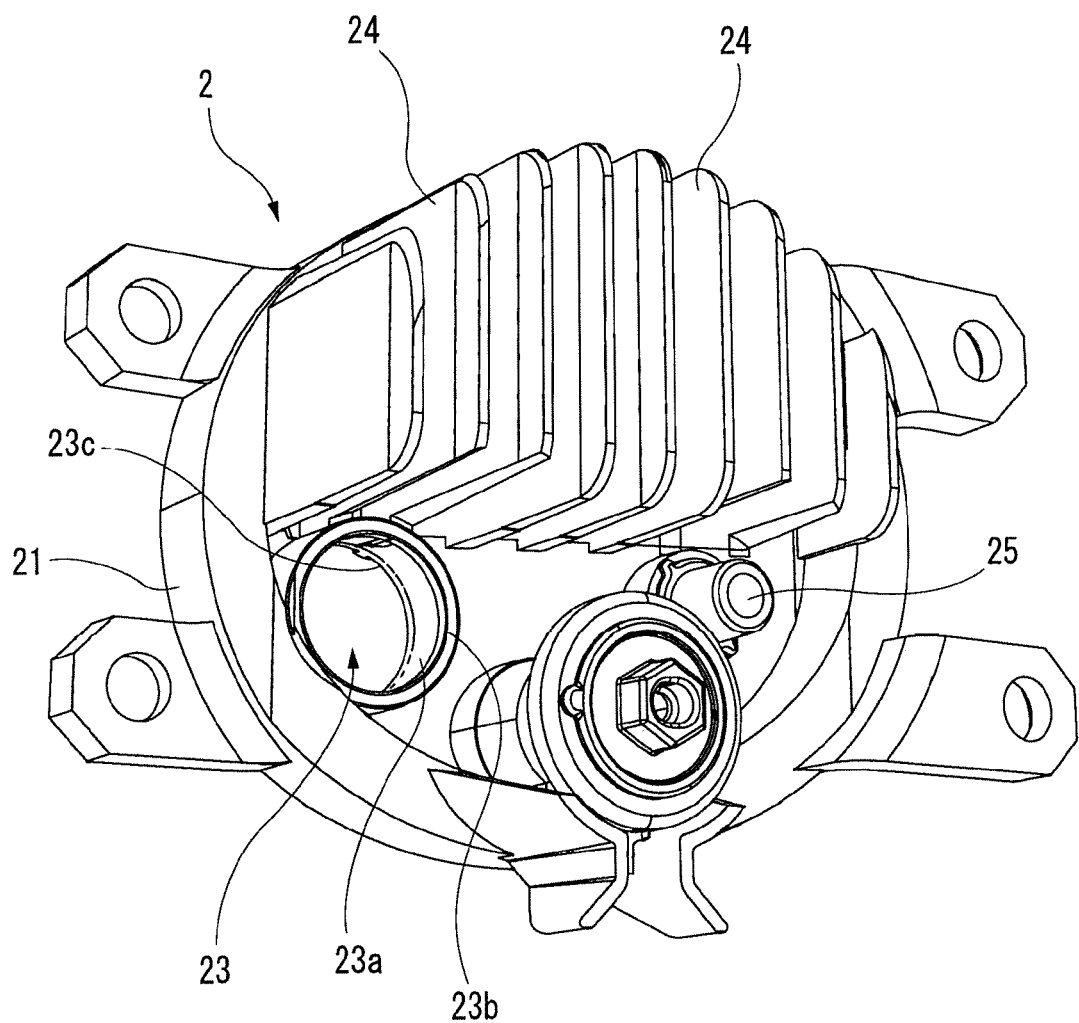
FIG. 11 is a front view depicting a part of the fog lamp of FIG. 1.
Figure 11:
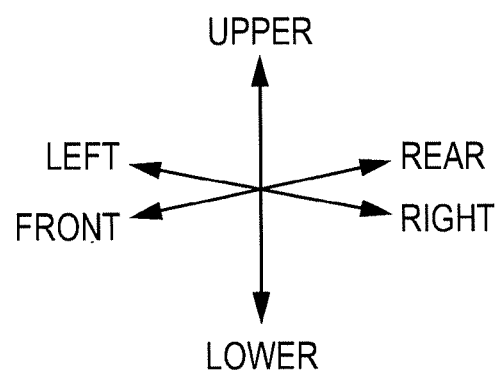

As shown in FIG. 11, the back plate 21 of the housing 2 is formed with a through-hole 23. The state of FIG. 7 is obtained by inserting the second connector housing 82 fixed to the substrate 71 into the through-hole 23 from the front of the back plate 21. At this time, the connection part 82a of the second connector housing 82 is arranged at the rear of the back plate 21. That is, the connection part 82a (an example of the first part of the power feeding connector) is arranged outside the housing 2. A part (an example of the second part of the power feeding connector) of the terminal holding part 82b of the second connector housing 82 is arranged in the through-hole 23.

Then, as shown in FIG. 6, the first connector housing 81 is mounted from the rear of the second connector housing 82. At this time, the pair of conductive terminals 81a held by the first connector housing 81 and the pair of conductive terminals 82c held by the second connector housing 82 are electrically connected. Thereby, a power feeding path from the external power supply to the light source 72 is formed.

In this embodiment, the substrate 71 is configured to support both the light source 72 and the control circuit 73. According to a general technical approach, a member configured to support the light source and a member configured to support the control circuit are separately provided so as to protect the control circuit from the light source that is to generate heat in association with light emission. However, in this embodiment, the conductive housing 2 is configured to support the substrate 71. In general, a conductive material has relatively high thermal conductivity. Also, the housing 2 can secure a large heat radiation area because it is coupled with the transparent cover 3 through which the light emitted from the light source 72 is to pass. In other words, the housing 2 itself can be used as a heat sink. Therefore, the light source 72 and the control circuit 73 share the substrate 71, so that it is possible to effectively dissipate the heat generated from the light source 72 while meeting the need for miniaturization of the fog lamp 1.

Also, in this embodiment, the connector unit 8 for power-feeding has the insulating second connector housing 82. The second connector housing 82 has the connection part 82a and the terminal holding part 82b. The connection part 82a is arranged outside the housing 2. A part of the terminal holding part 82b is arranged in the through-hole 23 of the housing 2. The pair of conductive terminals 82c held by the terminal holding part 82b is coupled with the substrate 71 and is electrically connected to the control circuit 73. Thereby, it is possible to omit a wiring for electrically connecting the substrate 71 and the connector unit 8. Therefore, also in this configuration, it is possible to meet the need for miniaturization of the fog lamp 1.

In the meantime, the entire terminal holding part 82b of the second connector housing 82 may be arranged in the through-hole 23 of the housing 2 inasmuch as the pair of conductive terminals 82c can be coupled to the substrate 71.

As shown in FIG. 11, the housing 2 has a plurality of heat radiation plates 24. The plurality of heat radiation plates 24 is provided on the backside of the back plate 21 and extends in an upper and lower direction. That is, the plurality of heat radiation plates 24 is arranged outside the lamp chamber 4.

The plurality of heat radiation plates 24 and the back plate 21 are integrally formed. That is, the housing 2 is a metallic one-piece member.

Also, the housing 2 has a ventilation part 25. The ventilation part 25 is configured to communicate with the lamp chamber 4 and to form a ventilation path opening towards the rear of the housing 2. As shown in FIG. 6, the housing 2 has a ventilation cap 26. The ventilation cap 26 is mounted to cover the ventilation part 25. Thereby, it is possible to prevent moisture and dust from being introduced into the lamp chamber 4 through the ventilation part 25.

According to the above configuration, it is possible to further improve the function of the housing 2 as a heat sink. Therefore, it is possible to further improve the dissipation performance of heat, which is to be generated in association with the light emission of the light source 72, while meeting the need for miniaturization of the fog lamp 1. In order to improve the dissipation performance of heat, it is preferably to increase the number of the plurality of heat radiation plates 24. Even though each heat radiation plate 24 becomes thinner as more heat radiation plates 24 are formed in a limited area for miniaturization, since the housing 2 is metallic one-piece member, it is possible to secure stiffness of each heat radiation plate 24. Therefore, it is possible to suppress a possibility that a heat radiation structure is to be deformed or damaged due to an external force, in addition to the above-described effects.

As shown in FIG. 8, the second connector housing 82 has a pair of engaging protrusions 82d. The pair of engaging protrusions 82d is formed at a tip end portion of the terminal holding part 82b. On the other hand, as shown in FIG. 9, the substrate 71 has a pair of engaging holes 71b. The pair of engaging holes 71b penetrates the substrate 71.

When the second connector housing 82 is mounted to the substrate 71, as shown in FIG. 10, the pair of engaging protrusions 82d is engaged with the pair of engaging holes 71b, as shown in FIG. 5. Thereby, the second connector housing 82 (an example of a part of the connector) is mechanically fastened to the substrate 71.

According to the above configuration, it is possible to protect the coupling between the pair of conductive terminals 82c and the substrate 71 from an external force that is to be applied to the second connector housing 82 after the second connector housing 82 is mounted to the substrate 71 (for example, as shown in FIG. 7, when the connection part 82a is enabled to pass through the through-hole 23). Therefore, it is possible to improve the connection reliability between the pair of conductive terminal 82c and the control circuit 73 while meeting the need for miniaturization of the fog lamp 1.

Figure 12:
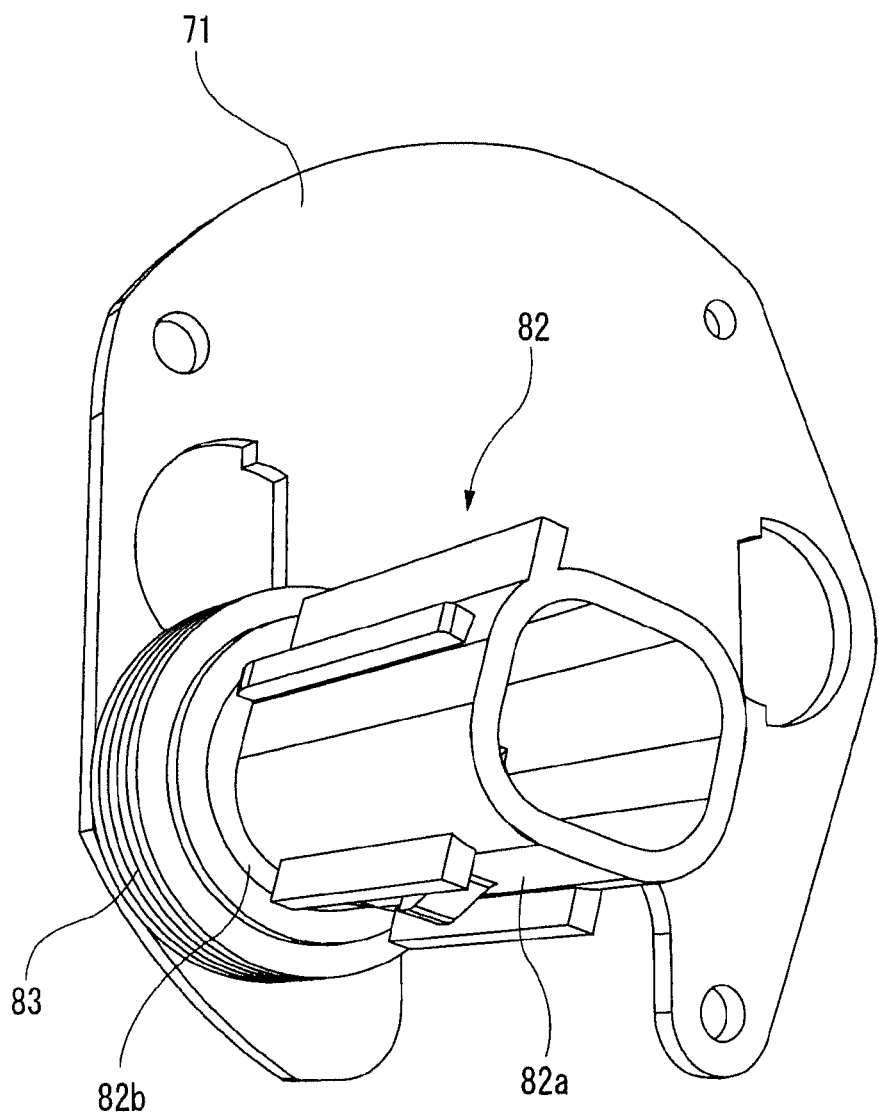
FIG. 12 is a perspective view depicting a modified embodiment of the second connector housing.
Figure 12:
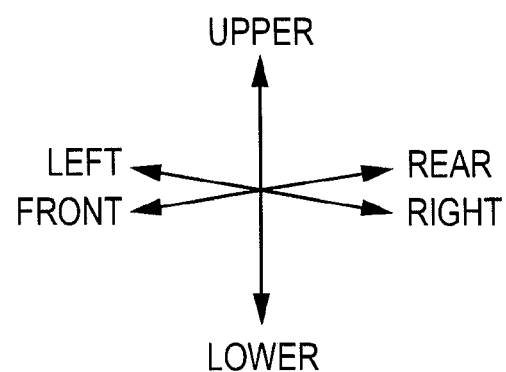

After the second connector housing 82 is mounted to the substrate 71, as shown in FIG. 12, a sealing member 83 may be mounted around the terminal holding part 82b. As the sealing member 83, an elastic O-ring or gasket may be exemplified. In this case, as shown in FIG. 7, the sealing member 83 is arranged between the terminal holding part 82b and an inner wall 23a (refer to FIG. 11) of the through-hole 23 at a state where the terminal holding part 82b is arranged in the through-hole 23.

According to the above configuration, a gap formed between the terminal holding part 82b and the inner wall 23a of the through-hole 23 is sealed by the sealing member 83. Thereby, it is possible to prevent the moisture and dust from being introduced into the lamp chamber 4 through the through-hole 23. Therefore, it is possible to protect the configuration in the lamp chamber 4 from the moisture and dust while meeting the need for miniaturization of the fog lamp 1.

As shown in FIG. 11, the through-hole 23 of the housing 2 has an outer opening 23b and an inner opening 23c. The outer opening 23b and the inner opening 23c are connected by the inner wall 23a. The outer opening 23b opens towards the backside of the back plate 21, i.e., an outside of the lamp chamber 4. The inner opening 23c opens towards the front surface of the back plate 21, i.e., an inside of the lamp chamber 4. The inner opening 23c is formed greater than the outer opening 23b. That is, the inner wall 23a is inclined relative to a direction in which the through-hole 23 extends.

According to the above configuration, it is possible to easily demold a mold that is to be used upon molding of the housing 2. Thereby, a yield is improved, which contributes to the saving of manufacturing cost. Therefore, it is possible to suppress the manufacturing cost while meeting the need for miniaturization of the fog lamp 1. In particular, the sealing member 83 shown in FIG. 12 is used together, so that dimension precision to be required for a shape of the terminal holding part 82b of the second connector housing 82 facing the inclined inner wall 23a of the through-hole 23 is relaxed and thus the manufacturing cost can be further suppressed.

The inner wall 23a of the through-hole 23 may be inclined so that the outer opening 23b is greater than the inner opening 23c, in correspondence to the specification of the mold for forming the housing 2.

As shown in FIG. 4, the lens holder 6 is fixed to the front surface of the substrate 71 of the light source unit 7. That is, a position of the lens holder 6 relative to the light source 72 is fixed. As shown in FIG. 3, the lens holder 6 is configured to support the projection lens 5. At least a part of the light emitted from the light source 72 passes through the projection lens 5. The light having passed through the projection lens 5 passes through the transparent cover 3 and illuminates the front of the fog lamp 1.

Figure 13:
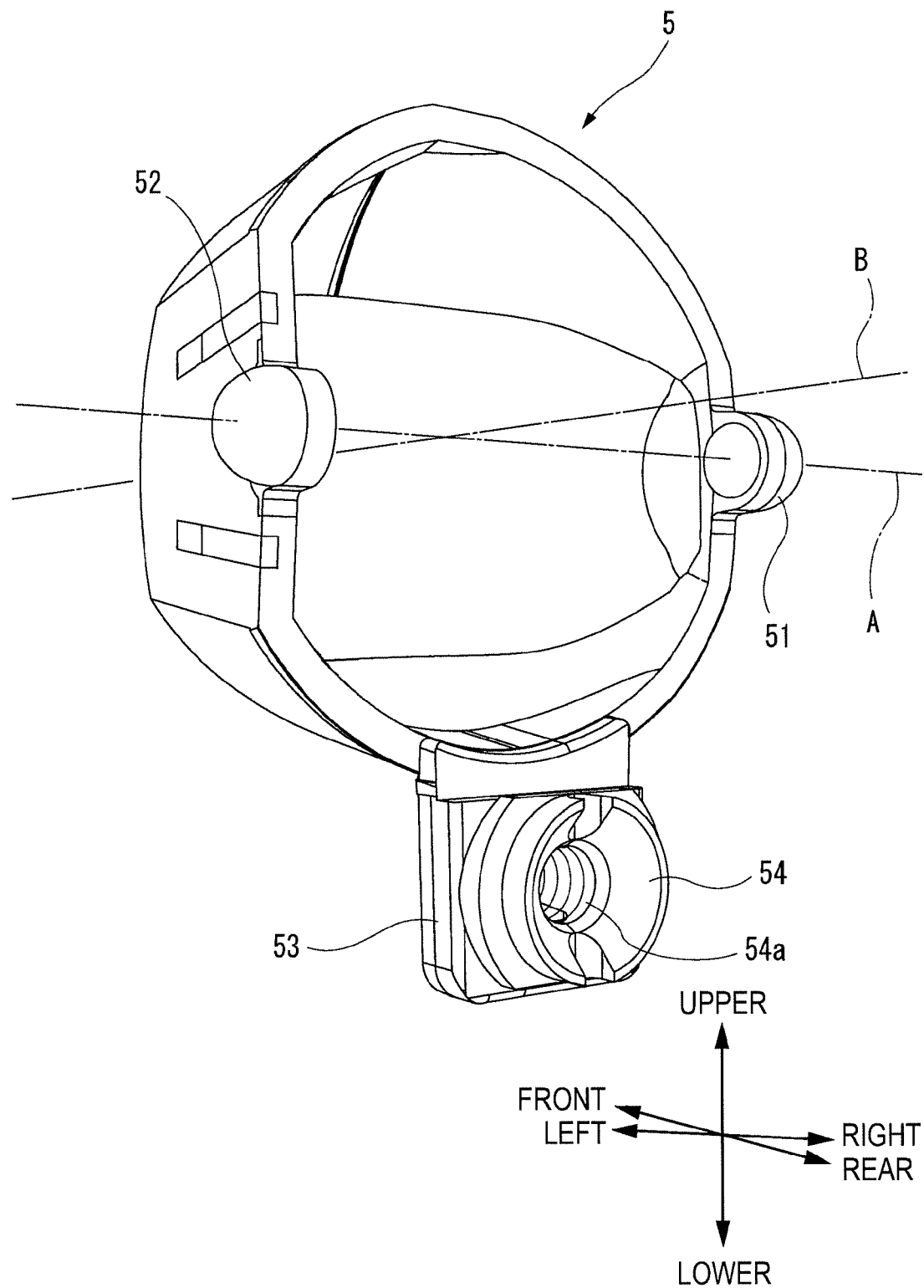
FIG. 13 is a perspective view depicting a projection lens of the fog lamp of FIG. 1.

Subsequently, a structure where the projection lens 5 is held at the lens holder 6 is described with reference to FIGS. 4 and 13. FIG. 13 is a perspective view depicting an outward appearance of the projection lens 5 as seen from a left rear bottom side.

As shown in FIG. 13, the projection lens 5 has a right shaft part 51 and a left shaft part 52. The right shaft part 51 is arranged at a right side part of the projection lens 5. The right shaft part 51 has a hemispherical shape and a spherical surface thereof faces rightwards. The left shaft part 52 is arranged at a left side part of the projection lens 5. The left shaft part 52 has a hemispherical shape and a spherical surface thereof faces leftwards. An axis line A connecting centers of the right shaft part 51 and the left shaft part 52 extends in a direction perpendicular to an optical axis B of the projection lens 5. That is, the right shaft part 51 and the left shaft part 52 extend in a direction intersecting with the optical axis B of the projection lens 5.

As shown in FIG. 4, the lens holder 6 has a right shaft holding part 61 and a left shaft holding part 62. The right shaft holding part 61 and the left shaft holding part 62 are provided on a front surface of the lens holder 6.

The right shaft holding part 61 has a peripheral wall 61a, a pair of protrusions 61b and a curved receiving surface 61c. The peripheral wall 61a protrudes forwards from the front surface of the lens holder 6 and extends in a semi-circular arc shape. The semi-circular arc opens leftwards. The pair of protrusions 61b extends to overhang towards an inside of the semi-circular arc from a front end portion of the peripheral wall 61a, respectively. The pair of protrusions 61b is configured to be slightly bendable rearwards, respectively. The curved receiving surface 61c is arranged inside the semi-circular arc drawn by the peripheral wall 61a and faces the pair of protrusions 61b. The curved receiving surface 61c has a shape conforming to the hemisphere face of the right shaft part 51.

The left shaft holding part 62 has a peripheral wall 62a, a pair of protrusions 62b and a curved receiving surface 62c. The peripheral wall 62a protrudes forwards from the front surface of the lens holder 6 and extends in a semi-circular arc shape. The semi-circular arc opens rightwards. The pair of protrusions 62b extends to overhang towards an inside of the semi-circular arc from a front end portion of the peripheral wall 62a, respectively. The pair of protrusions 62b is configured to be slightly bendable rearwards, respectively. The curved receiving surface 62c is arranged inside the semi-circular arc drawn by the peripheral wall 62a and faces the pair of protrusions 62b. In FIG. 4, the pair of protrusions 62b is hidden. However, the curved receiving surface 62c is bilaterally symmetric to the curved receiving surface 61c, and has a shape conforming to the hemisphere face of the left shaft part 52.

The projection lens 5 and the lens holder 6 having the above configuration are coupled as shown in FIG. 3. At this time, the right shaft part 51 of the projection lens 5 is held at the right shaft holding part 61 of the lens holder 6. The left shaft part 52 of the projection lens 5 is held at the left shaft holding part 62 of the lens holder 6.

Specifically, the right shaft part 51 is pressed by the right shaft holding part 61, so that the right shaft part 51 is introduced into an area surrounded by the peripheral wall 61a while deforming rearwards the pair of protrusions 61b. When a part of the hemisphere face of the right shaft part 51 contacts the curved receiving surface 61c, the pair of protrusions 61b returns to original positions thereof and prevents the right shaft part 51 from separating forwards. Thereby, the right shaft part 51 can rotate in a plane perpendicular to the axis line A of FIG. 13, in the area surrounded by the peripheral wall 61a.

Likewise, the left shaft part 52 is pressed by the left shaft holding part 62, so that the left shaft part 52 is introduced into an area surrounded by the peripheral wall 62a while deforming rearwards the pair of protrusions 62b. When a part of the hemisphere face of the left shaft part 52 contacts the curved receiving surface 62c, the pair of protrusions 62b returns to original positions thereof and prevents the left shaft part 52 from separating forwards. Thereby, the left shaft part 52 can rotate in the plane perpendicular to the axis line A of FIG. 13, in the area surrounded by the peripheral wall 62a.

As shown in FIGS. 5 and 6, the fog lamp 1 includes an adjustment mechanism 9. The adjustment mechanism 9 has a head part 91 and a shaft part 92. As shown in FIG. 6, the head part 91 is arranged below the plurality of heat radiation plates 24 on the backside of the back plate 21 of the housing 2. That is, the head part 91 is arranged outside the housing 2. The head part 91 is configured to be rotatably operated by a predetermined tool. The shaft part 92 extends into the lamp chamber 4 through the back plate 21. An outer peripheral surface of the shaft part 92 is formed with a screw groove.

As shown in FIG. 13, the projection lens 5 has a coupling part 53 and a joint 54. The coupling part 53 is formed integrally with a lower part of the projection lens 5 and extends downwards from the lower part. The joint 54 is mounted to the coupling part 53. The joint 54 is formed with a through-hole 54a. An inner peripheral surface of the through-hole 54a is formed with a screw groove.

As shown in FIG. 3, the shaft part 92 of the adjustment mechanism 9 is inserted into the through-hole 54a of the joint 54. At this time, the screw groove formed on the outer peripheral surface of the shaft part 92 and the screw groove formed on the inner peripheral surface of the through-hole 54a are screwed. When the head part 91 of the adjustment mechanism 9 is rotated by the predetermined tool, a screwing position of the shaft part 92 and the joint 54 is changed. Thereby, the joint 54 is displaced in the front and rear direction.

Figure 14A:
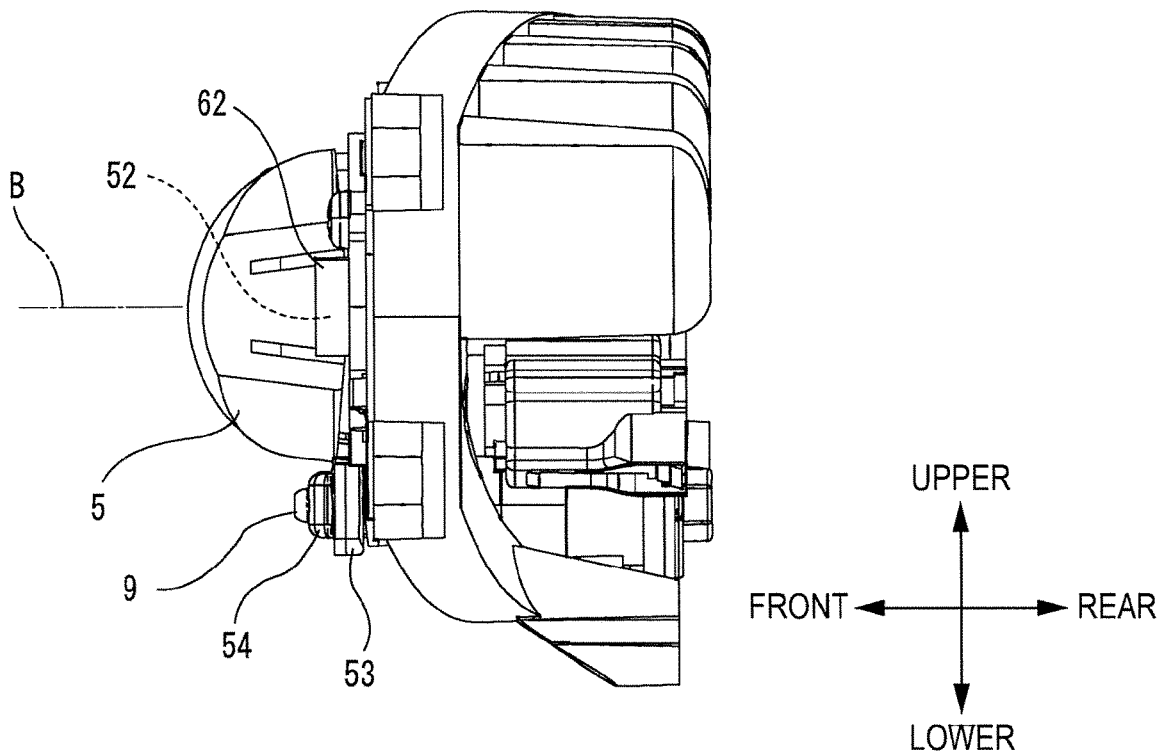
FIG. 14A is a left side view illustrating an operation of an adjustment mechanism of the fog lamp of FIG. 1.
Figure 14B:
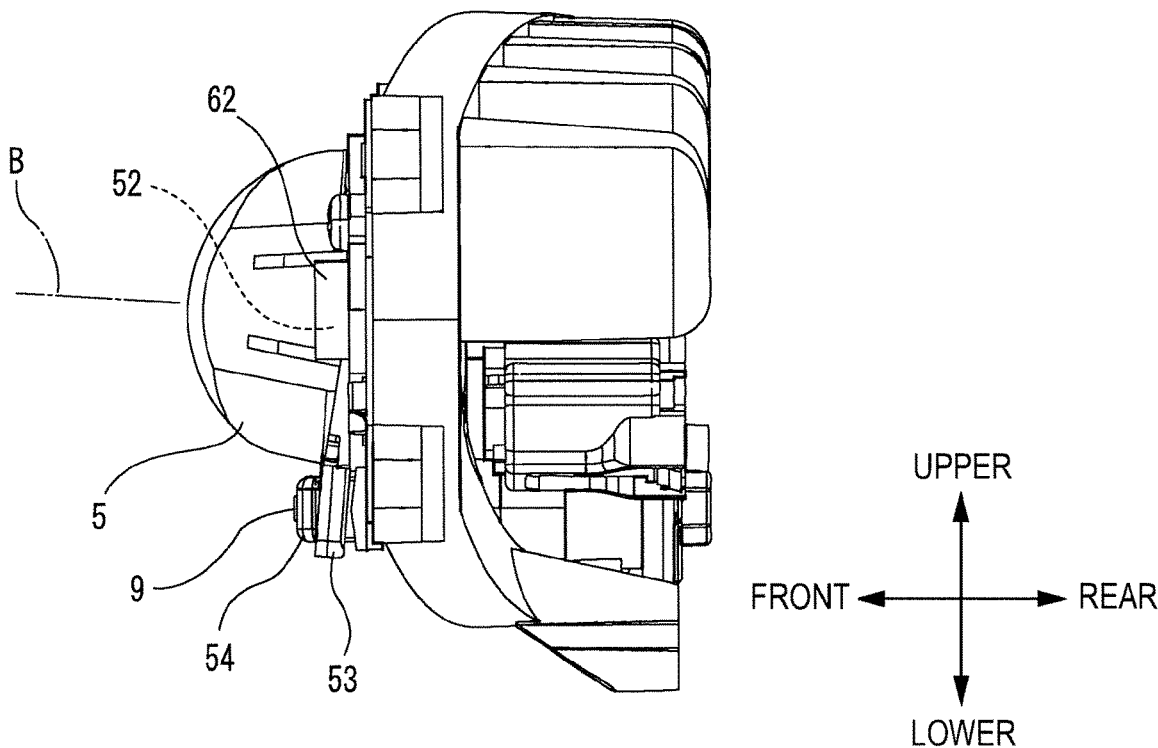
FIG. 14B is a left side view illustrating the operation of the adjustment mechanism of the fog lamp of FIG. 1.
Figure 14C:
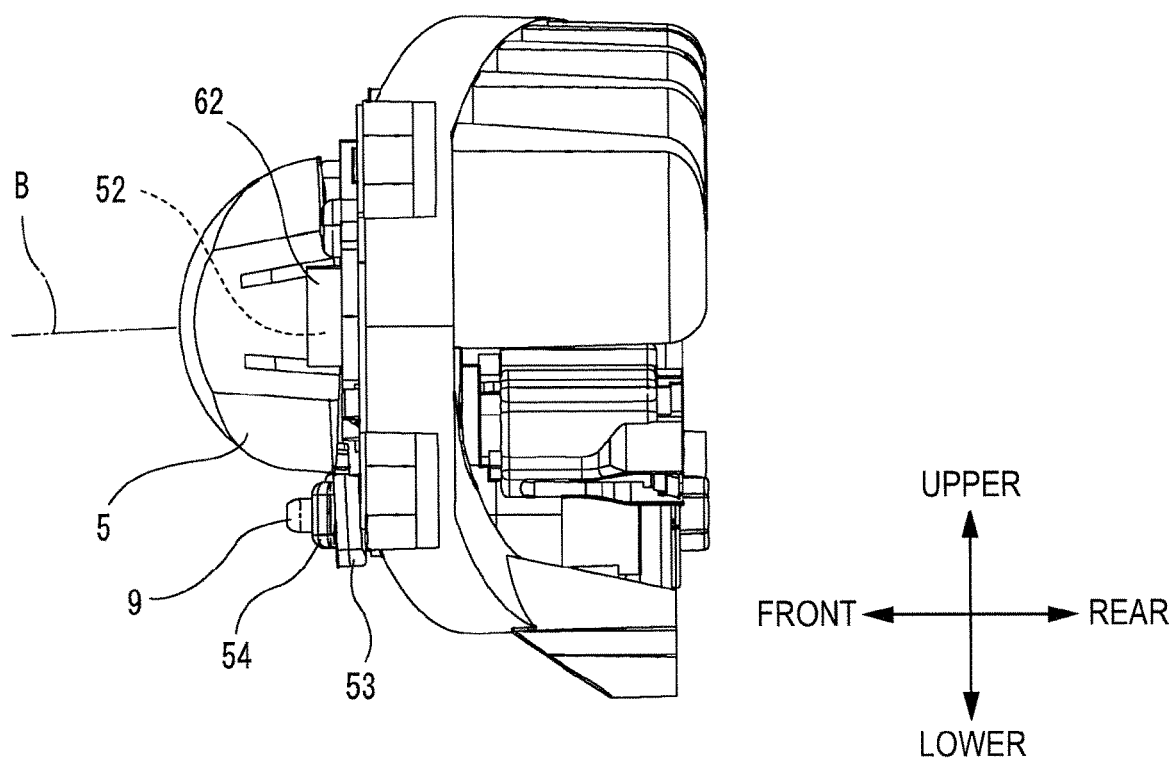
FIG. 14C is a left side view illustrating the operation of the adjustment mechanism of the fog lamp of FIG. 1.

FIGS. 14A to 14C are left side views for illustrating movement of the projection lens 5 in association with operation of the adjustment mechanism 9. FIG. 14A depicts an initial state.

When the head part 91 of the adjustment mechanism 9 is rotated in a counterclockwise direction from the initial state, as seen from rear, the joint 54 is displaced forwards. In association with this, the coupling part 53 of the projection lens 5 is pushed forwards. At this time, the right shaft part 51 and the left shaft part 52 of the projection lens 5 are respectively rotated in the right shaft holding part 61 and the left shaft holding part 62 of the lens holder 6, in a clockwise direction as seen from left. Since the projection lens 5 is supported to the lens holder 6, the optical axis B of the projection lens 5 is inclined upwards, as shown in FIG. 14B.

On the other hand, when the head part 91 of the adjustment mechanism 9 is rotated in the clockwise direction, as seen from rear, the joint 54 is displaced rearwards. In association with this, the coupling part 53 of the projection lens 5 is pulled rearwards. At this time, the right shaft part 51 and the left shaft part 52 of the projection lens 5 are respectively rotated in the right shaft holding part 61 and the left shaft holding part 62 of the lens holder 6, in the counterclockwise direction as seen from left. Since the projection lens 5 is supported to lens holder 6, the optical axis B of the projection lens 5 is inclined downwards, as shown in FIG. 14C.

That is, when the head part 91 of the adjustment mechanism 9 is rotated, the shaft part 92 is rotated and the rotation of the shaft part 92 is converted into a force of rotating the projection lens 5 by the joint 54. Thereby, it is possible to adjust a reference position in the upper and lower direction of the optical axis B of the projection lens 5 by rotating the adjustment mechanism 9.

According to the above configuration, it is possible to adjust the reference position of the optical axis B of the projection lens 5 by directly rotating the projection lens 5 held at the lens holder 6. Since the projection lens 5 is a smaller and lighter component than the housing 2, it is possible to effectively change a posture of the projection lens 5 while avoiding enlargement of a mechanism relating to the optical axis adjustment. Therefore, it is possible to meet the need for miniaturization of the fog lamp 1 while providing the projection lens 5 and the mechanism configured to adjust the optical axis of the projection lens.

Figure 15:
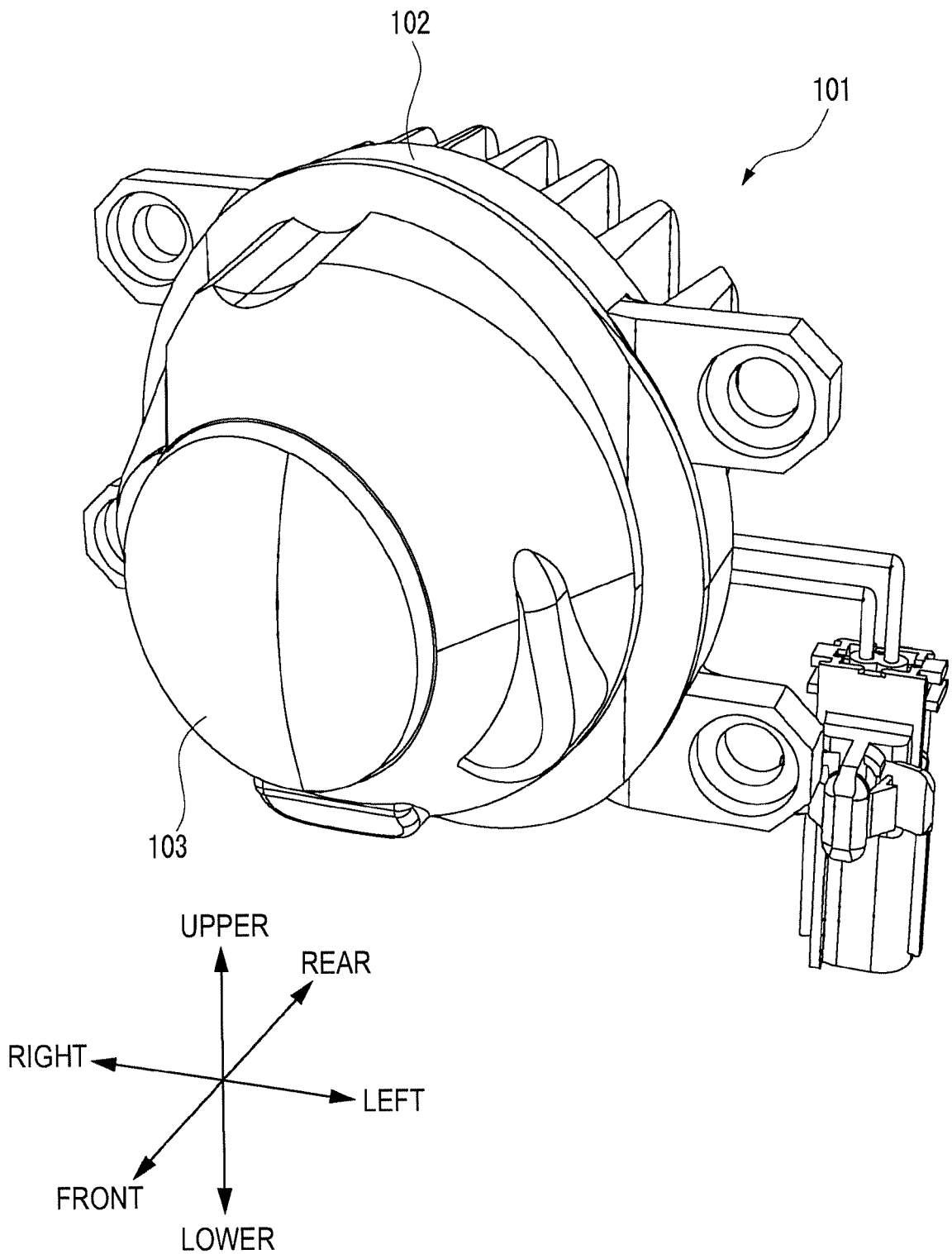
FIG. 15 is a perspective view depicting a fog lamp in accordance with a second embodiment.
Figure 16:
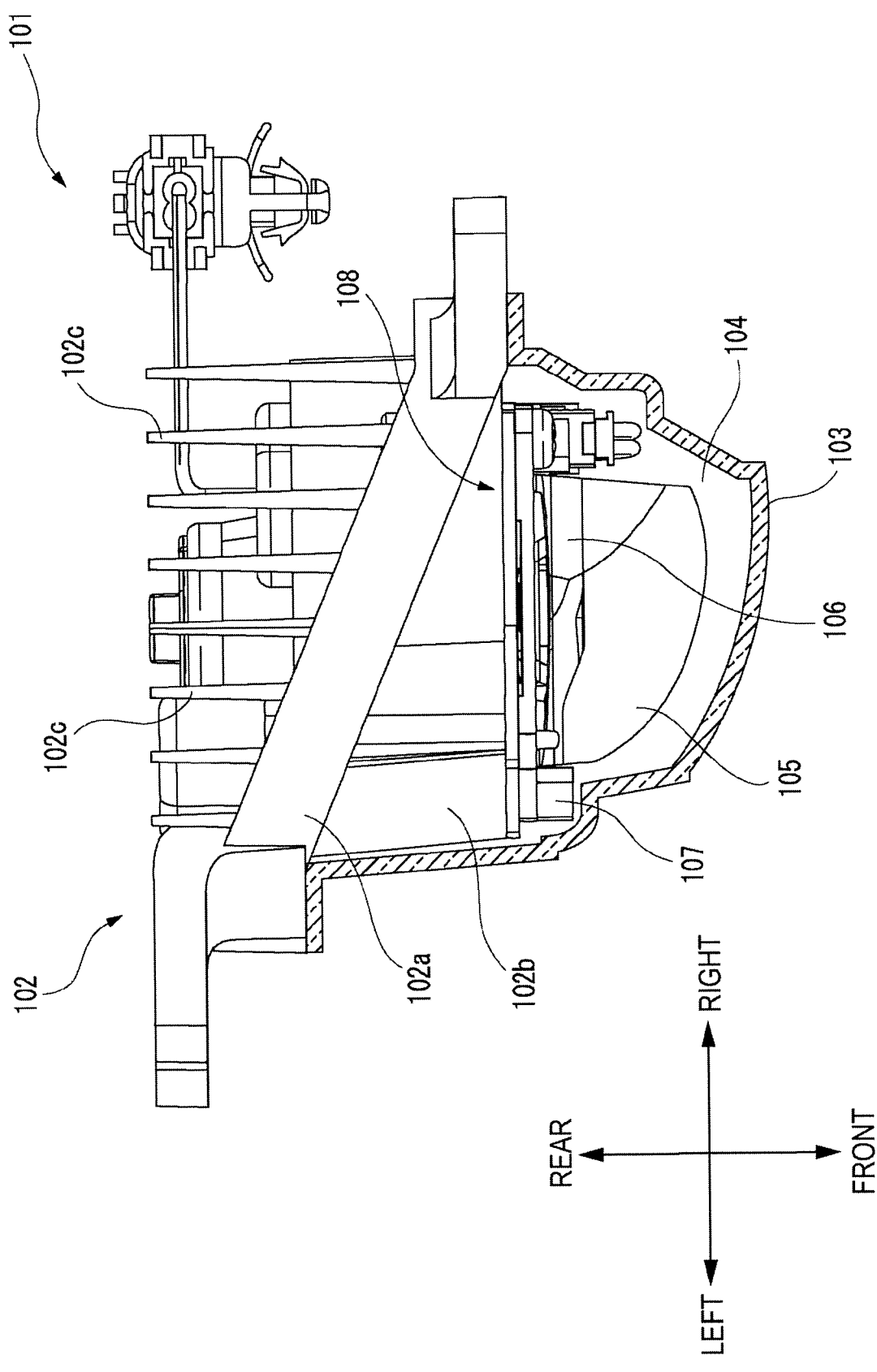
FIG. 16 is a plan view depicting the fog lamp of FIG. 15, in a form of a partial sectional view.

FIG. 15 is a perspective view depicting an outward appearance of a fog lamp 101 (an example of the lighting device) in accordance with an embodiment, as seen from a left front top side. The fog lamp 101 includes a housing 102 and a transparent cover 103. FIG. 16 depicts the fog lamp 101 as seen from above, in which only the transparent cover 103 is shown in a sectional view. The transparent cover 103 is mounted to the housing 102 and defines a lamp chamber 104.

The housing 102 includes a back plate 102a, a support table 102b and a plurality of heat radiation plates 102c. The back plate 102a has a circular plate shape so as to minimize an occupying area upon mounting to a vehicle. The support table 102b is provided at the front of the back plate 102a and is accommodated in the lamp chamber 104. The plurality of heat radiation plates 102c is provided on a backside of the back plate 102a and extends in the upper and lower direction. That is, the plurality of heat radiation plates 102c is arranged outside the lamp chamber 104. The back plate 102a, the support table 102b and the plurality of heat radiation plates 102c are integrally formed by a material having high thermal conductivity, such as metal. That is, the housing 102 defines a part of the lamp chamber 104 and also serves as a heat sink.

As shown in FIG. 6, the fog lamp 101 includes a projection lens 105, a first support member 106, a second support member 107 and a light source unit 108. The projection lens 105, the first support member 106, the second support member 107 and the light source unit 108 are accommodated in the lamp chamber 104.

Figure 17:
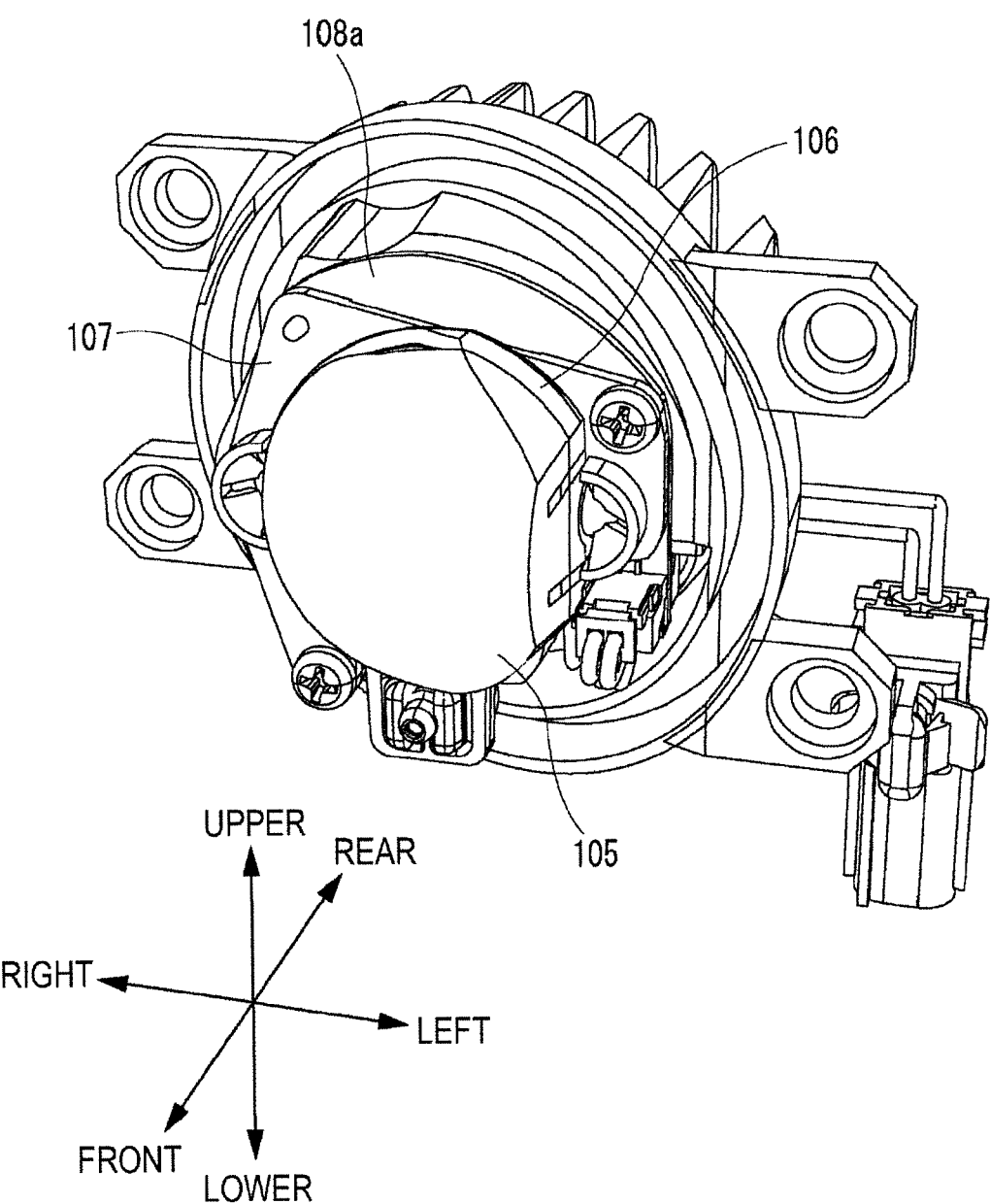
FIG. 17 is a perspective view depicting a part of the fog lamp of FIG. 15.
Figure 18:
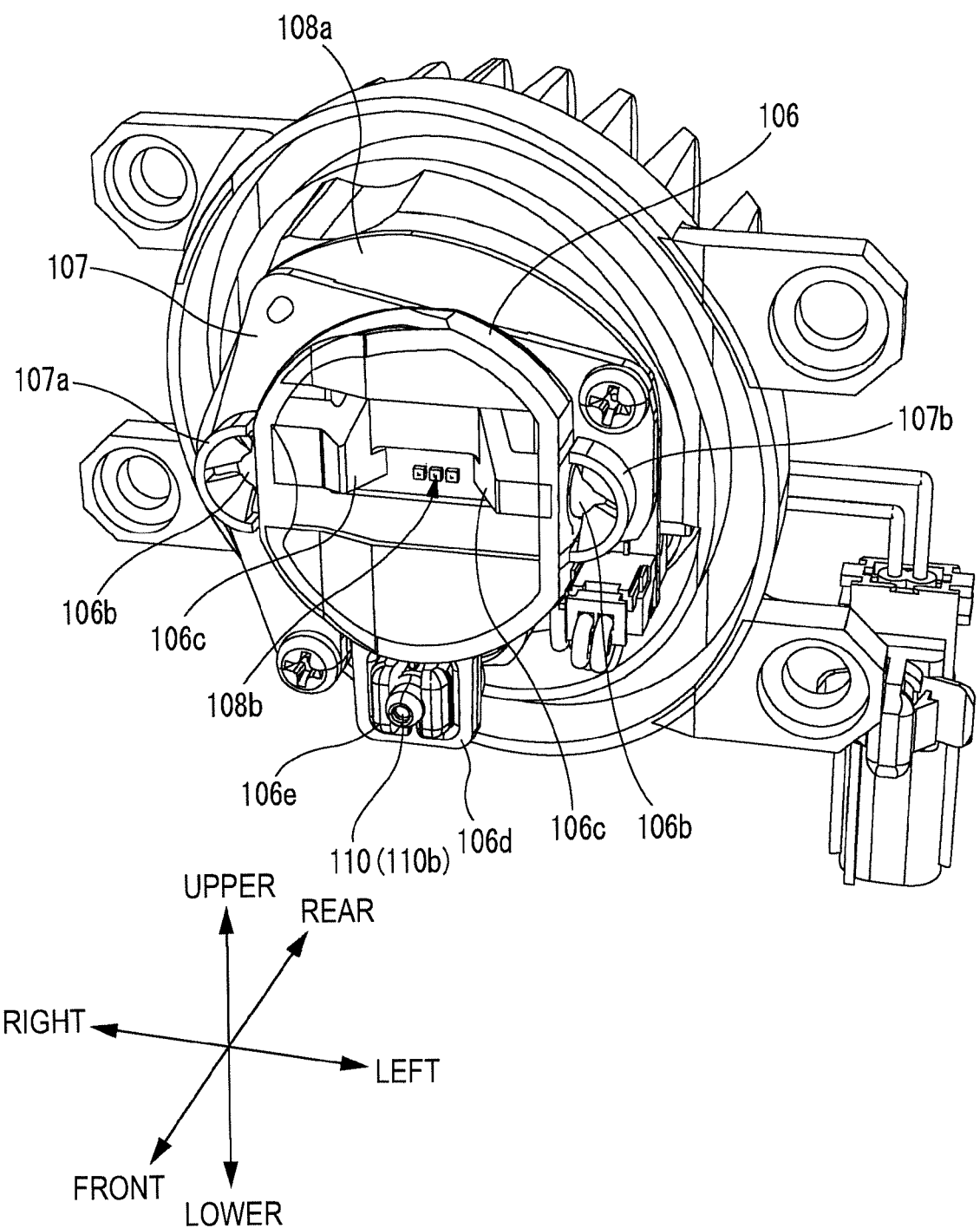
FIG. 18 is a perspective view depicting a part of the fog lamp of FIG. 15.
Figure 19:
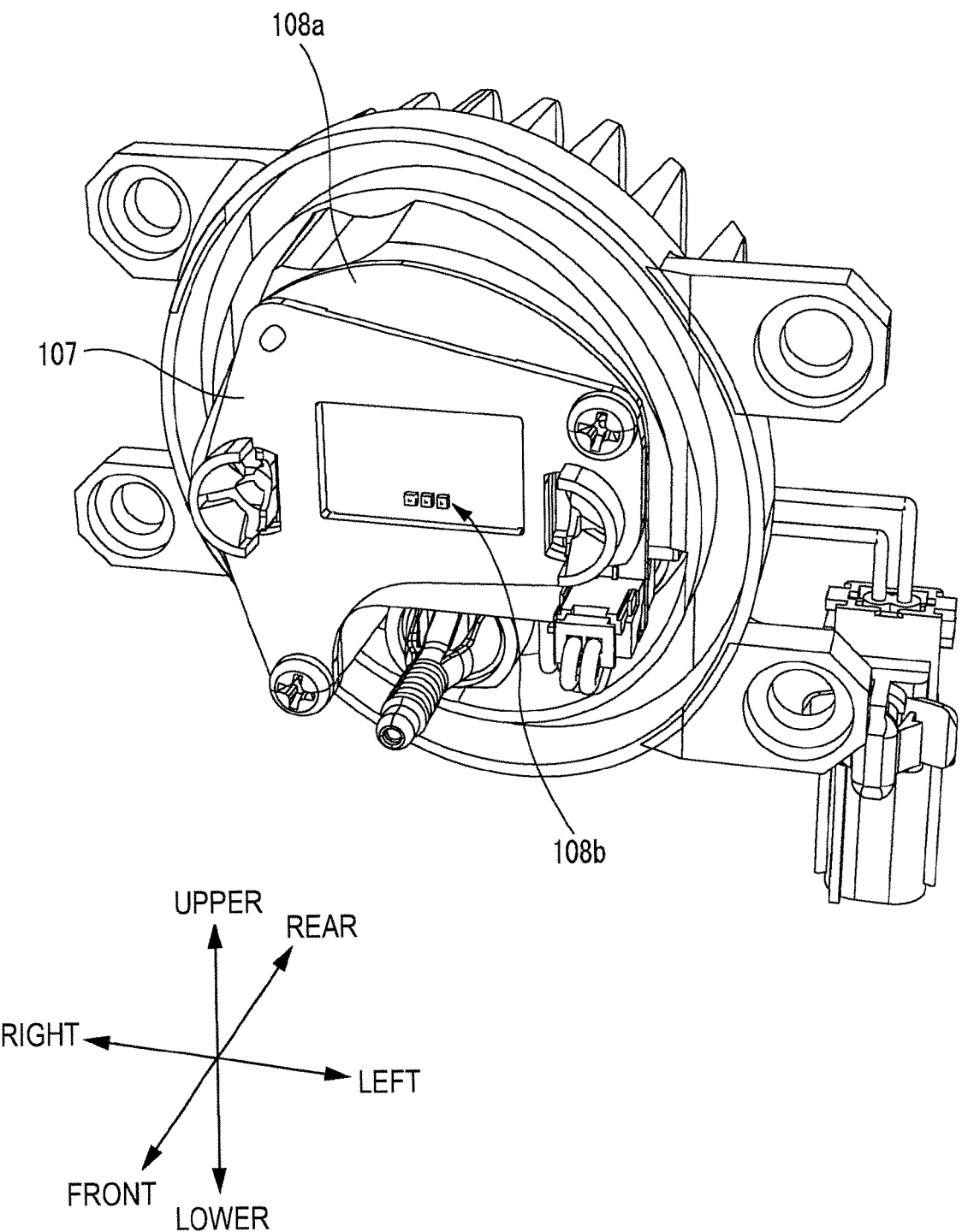
FIG. 19 is a perspective view depicting a part of the fog lamp of FIG. 15.
Figure 20:
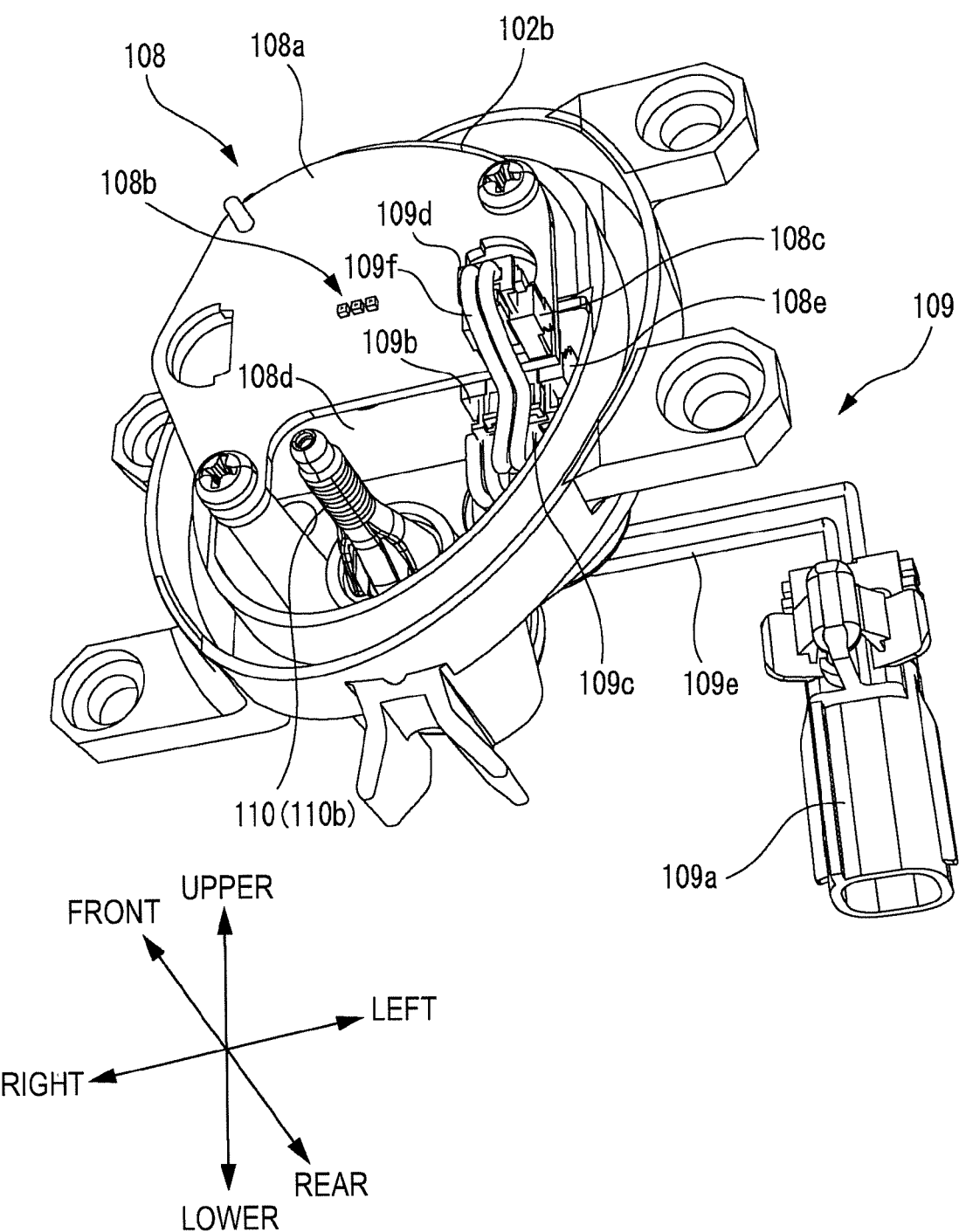
FIG. 20 is a perspective view depicting a part of the fog lamp of FIG. 15.

FIG. 17 is a perspective view depicting a part of the fog lamp 101 as seen from a left front top side, in which transparent cover 103 is detached from the state of FIG. 1. FIG. 18 is a perspective view depicting a part of the fog lamp 101 as seen from a left front top side, in which the projection lens 105 is detached from the state shown in FIG. 17. FIG. 19 is a perspective view depicting a part of the fog lamp 101 as seen from a left front top side, in which the first support member 106 is detached from the state shown in FIG. 18. FIG. 20 is a perspective view depicting a part of the fog lamp 101 as seen from a left front bottom side, in which the second support member 107 is detached from the state shown in FIG. 19.

As shown in FIG. 20, the light source unit 108 includes a support substrate 108a, a light source 108b and a first connector 108c. The support substrate 108a is mounted to a front surface of the support table 102b of the housing 102. The light source 108b and the first connector 108c are arranged on a front surface of the support substrate 108a. The support substrate 108a is formed with a circuit wiring (not shown) and is configured to electrically connect the light source 108b and the first connector 108c.

In this embodiment, the light source 108b consists of a plurality of semiconductor light emitting elements. As the semiconductor light emitting element, a light emitting diode, a laser diode, an organic EL element and the like may be exemplified. The number of light emitting elements is appropriately determined depending on the specification. Also, as the light source 108, a lamp light source (a discharge lamp, a halogen bulb or the like) may be used.

The light source unit 108 further includes a driving circuit board 108d and a second connector 108e. The driving circuit board 108d has a light source driving circuit configured to control lighting and lights-out of the light source 108b. The second connector 108e is electrically connected to the circuit. The driving circuit board 108d is mounted on a lower surface of the support table 102b of the housing 102.

Figure 21:
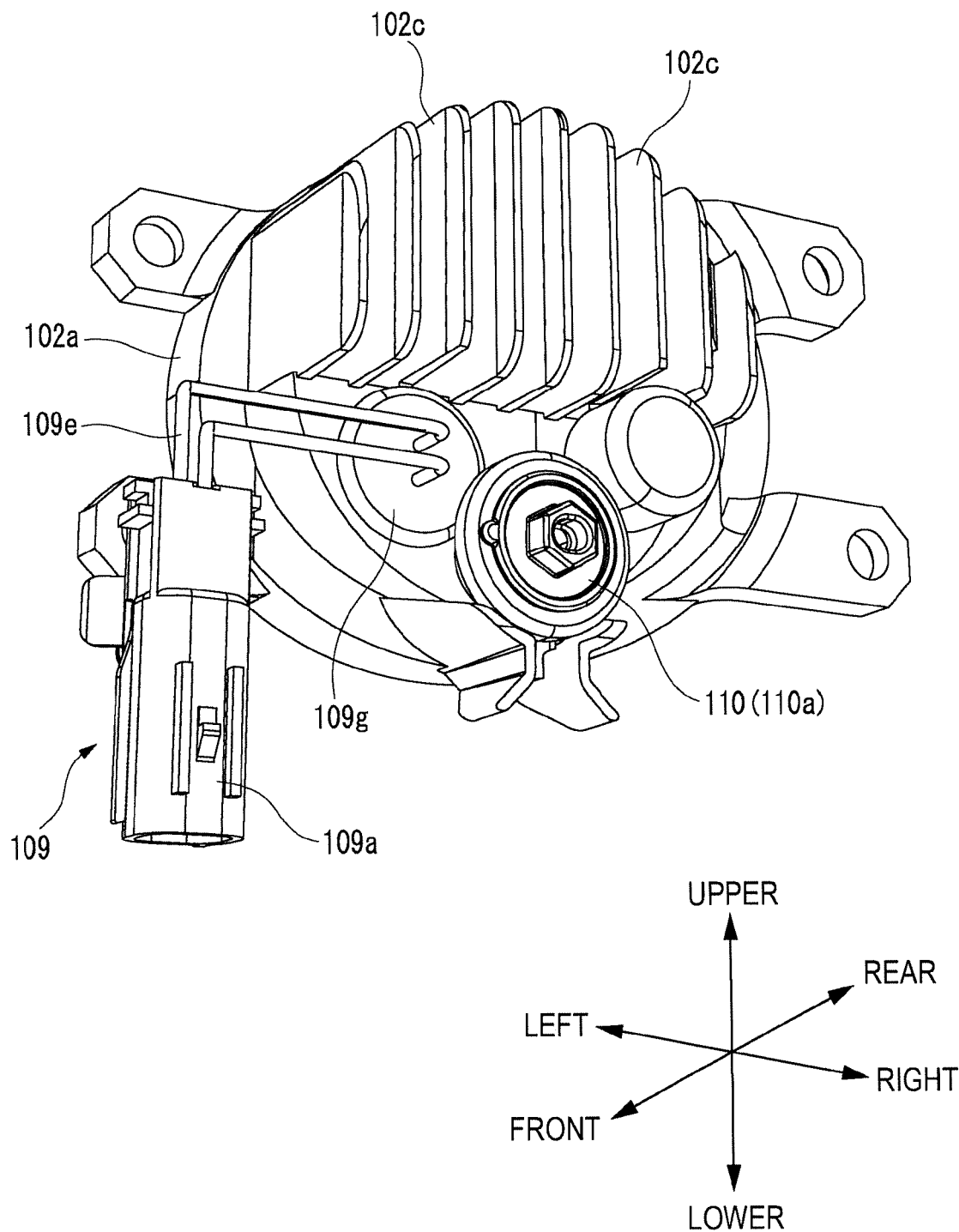
FIG. 21 is a perspective view depicting a part of the fog lamp of FIG. 15.

FIG. 21 is a perspective view depicting a part of the fog lamp 101 as seen from a left rear bottom side. As shown in FIGS. 20 and 21, the fog lamp 101 includes a wiring unit 109. The wiring unit 109 includes an external connector 109a, a first internal connector 109b, a second internal connector 109c, a third internal connector 109d, a first connection line 109e, a second connection line 109f and a sealing member 109g.

The external connector 109a is arranged outside the lamp chamber 104. The external connector 109a is configured to be connectable to the other party connector (not shown), which is connected to a power supply or a unified control unit of a vehicle on which the fog lamp 101 is to be mounted so that power can be fed or communication can be performed. The first internal connector 109b is connected in communication with the external connector 109a via the first connection line 109e. The first internal connector 109b is connected to the second connector 108e provided at the driving circuit board 108d. The power supplied from the power supply or a control signal transmitted from the unified control unit is input to the light source driving circuit of the driving circuit board 108d via the external connector 109a, the first internal connector 109b and the second connector 108e.

The first connection line 109e extends through the sealing member 109g. The sealing member 109g is fitted in a through-hole of the back plate 102a below the support table 102b and the plurality of heat radiation plates 102c.

The second internal connector 109c and the third internal connector 109d are connected via the second connection line 109f so that power can be fed or communication can be performed. The second internal connector 109c is connected to the second connector 108e provided at the driving circuit board 108d. As shown in FIG. 20, the third internal connector 109d is connected to the first connector 108c provided at the support substrate 108a. A control signal output from the light source driving circuit of the driving circuit board 108d is input to the light source 108b via the second internal connector 109c, the third internal connector 109d and the first connector 108c. Thereby, the light source 108b performs desired lighting and lights-out operations.

As shown in FIG. 19, the second support member 107 is fixed to the front surface of the support substrate 108a of the light source unit 108. As shown in FIG. 18, the second support member 107 is configured to support the first support member 106. As shown in FIG. 17, the first support member 106 is configured to support the projection lens 105.

Figure 22:
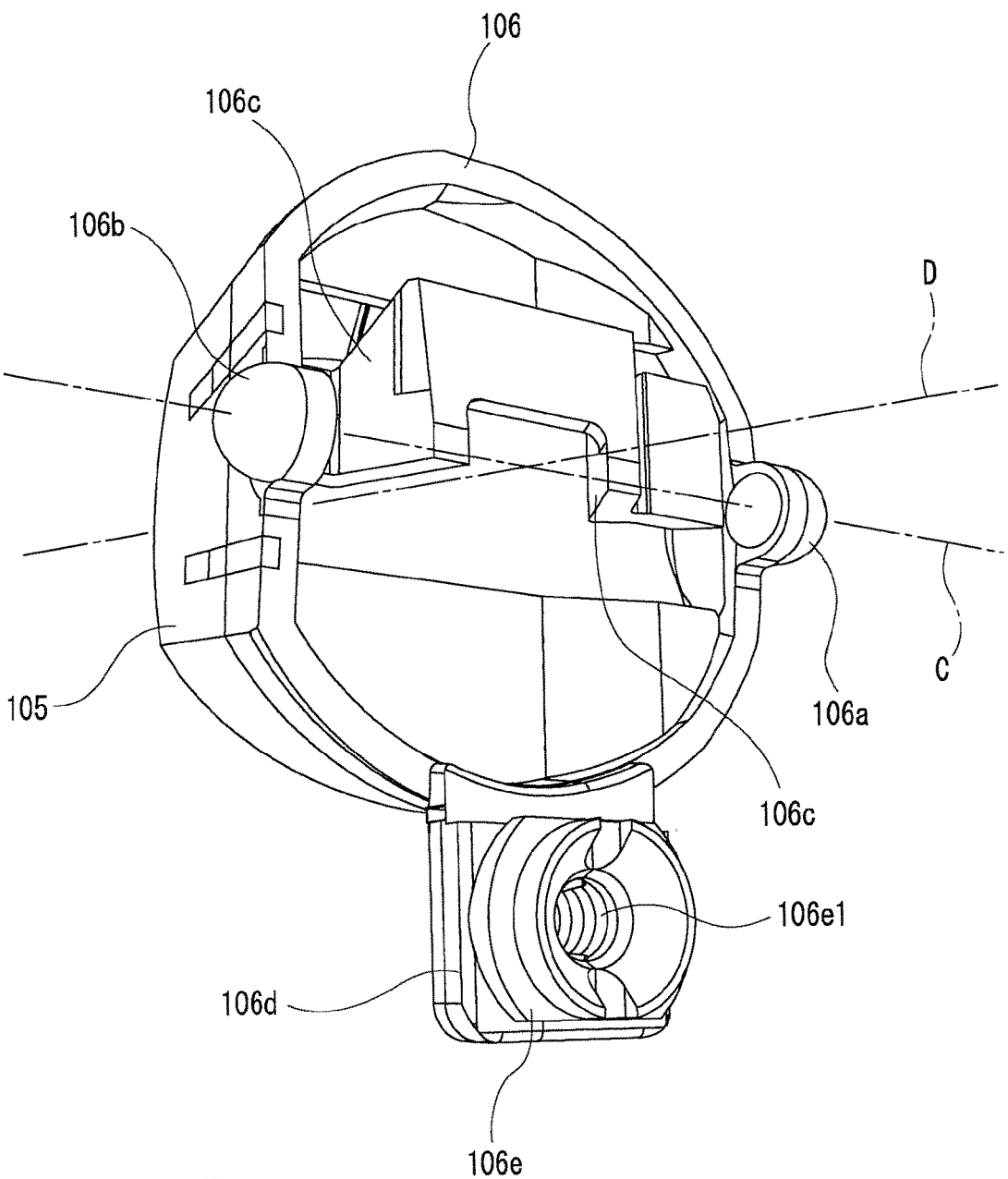
FIG. 22 is a perspective view depicting a first support member of the fog lamp of FIG. 15.
Figure 22:
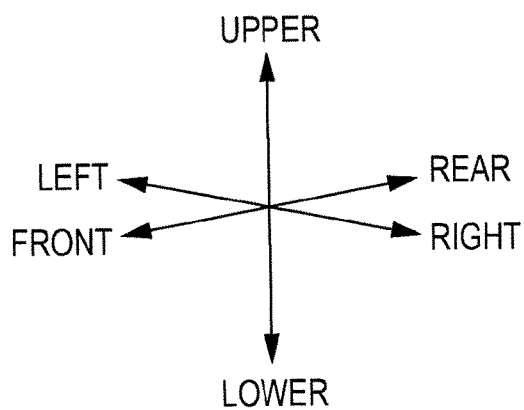
Figure 23:
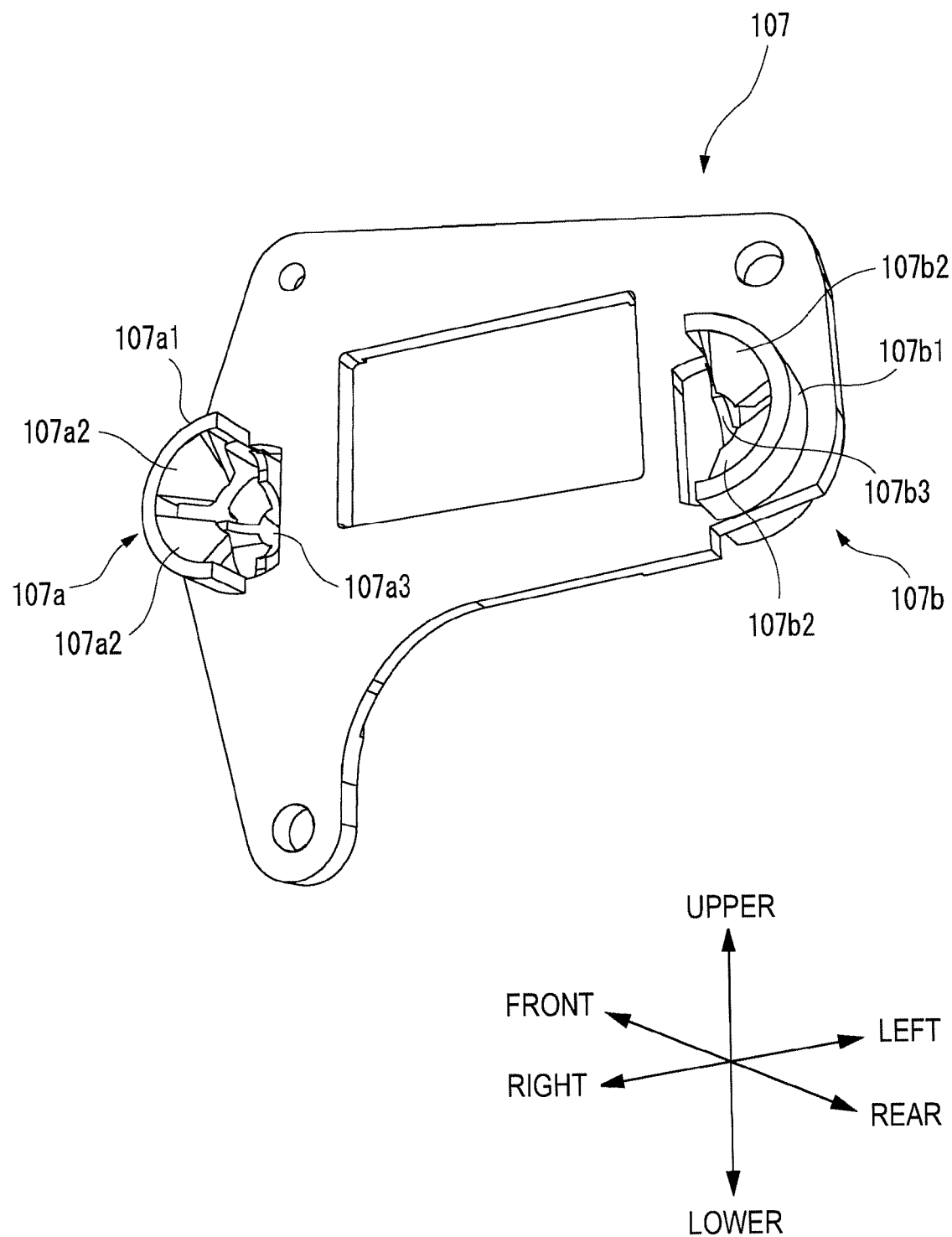
FIG. 23 is a perspective view depicting a second support member of the fog lamp of FIG. 15.

Subsequently, a structure where the first support member 106 is supported to the second support member 107 is described with reference to FIGS. 22 and 23. FIG. 22 is a perspective view depicting an outward appearance of the first support member 106 configured to support the projection lens 105, as seen from a left rear bottom side. The projection lens 105 is fixed to a front part of the first support member 106. That is, a relative position between the projection lens 105 and the first support member 106 is not changed. FIG. 23 is a perspective view depicting an outward appearance of the second support member 107, as seen from a left front bottom side.

As shown in FIG. 22, the first support member 106 has a right shaft part 106a and a left shaft part 106b. The right shaft part 106a is arranged at a right side part of the first support member 106. The right shaft part 106a has a hemispherical shape and a spherical surface thereof faces rightwards. The left shaft part 106b is arranged at a left side part of the first support member 106. The left shaft part 106b has a hemispherical shape and a spherical surface thereof faces leftwards. An axis line C connecting centers of the right shaft part 106a and the left shaft part 106b extends in a direction perpendicular to an optical axis D of the projection lens 105. That is, the right shaft part 106a and the left shaft part 106b extend in a direction intersecting with the optical axis D of the projection lens 105.

As shown in FIG. 23, the second support member 107 has a right shaft holding part 107a and a left shaft holding part 107b. The right shaft holding part 107a and the left shaft holding part 107b are provided on a front surface of the second support member 107.

The right shaft holding part 107a has a peripheral wall 107a1, a pair of protrusions 107a2 and a curved receiving surface 107a3. The peripheral wall 107a1 protrudes forwards from the front surface of the second support member 107 and extends in a semi-circular arc shape. The semi-circular arc opens leftwards. The pair of protrusions 107a2 extends to overhang towards an inside of the semi-circular arc from a front end portion of the peripheral wall 107a1, respectively. The pair of protrusions 107a2 is configured to be slightly bendable rearwards, respectively. The curved receiving surface 107a3 is arranged inside the semi-circular arc drawn by the peripheral wall 107a1 and faces the pair of protrusions 107a2. The curved receiving surface 107a3 has a shape conforming to the hemisphere face of the right shaft part 106a.

The left shaft holding part 107b has a peripheral wall 107b1, a pair of protrusions 107b2 and a curved receiving surface 107b3. The peripheral wall 107b1 protrudes forwards from the front surface of the second support member 107 and extends in a semi-circular arc shape. The semi-circular arc opens rightwards. The pair of protrusions 107b2 extends to overhang towards an inside of the semi-circular arc from a front end portion of the peripheral wall 107b1, respectively. The pair of protrusions 107b2 is configured to be slightly bendable rearwards, respectively. The curved receiving surface 107b3 is arranged inside the semi-circular arc drawn by the peripheral wall 107b1 and faces the pair of protrusions 107b2. In FIG. 23, the pair of protrusions 107b2 is hidden. However, the curved receiving surface 107b3 is bilaterally symmetric to the curved receiving surface 107a3, and has a shape conforming to the hemisphere face of the left shaft part 106b.

The first support member 106 and the second support member 107 having the above configuration are coupled as shown in FIG. 18. At this time, the right shaft part 106a and the left shaft part 106b of the first support member 106 are respectively held at the right shaft holding part 107a and the left shaft holding part 107b of the second support member 107.

Specifically, the right shaft part 106a is pressed by the right shaft holding part 107a, so that the right shaft part 106a is introduced into an area surrounded by the peripheral wall 107a1 while deforming rearwards the pair of protrusions 107a2. When a part of the hemisphere face of the right shaft part 106a contacts the curved receiving surface 107a3, the pair of protrusions 107a2 returns to original positions thereof and prevents the right shaft part 106a from separating forwards. Thereby, the right shaft part 106a can rotate in a plane perpendicular to the axis line C of FIG. 22, in the area surrounded by the peripheral wall 107a1.

Likewise, the left shaft part 106b is pressed by the left shaft holding part 107b, so that the left shaft part 106b is introduced into an area surrounded by the peripheral wall 107b1 while deforming rearwards the pair of protrusions 107b2. When a part of the hemisphere face of the left shaft part 106b contacts the curved receiving surface 107b3, the pair of protrusions 107b2 returns to original positions thereof and prevents the left shaft part 106b from separating forwards. Thereby, the left shaft part 106b can rotate in the plane perpendicular to the axis line C of FIG. 22, in the area surrounded by the peripheral wall 107b1.

As shown in FIGS. 18 and 22, the first support member 106 has a pair of reflectors 106c. The pair of reflectors 106c has such a shape and arrangement that the light emitted from the light source 108b of the light source unit 108 is to be reflected towards the projection lens 105. At least a part of the light reflected by the reflectors 106c passes through the projection lens 105. The light having passed through the projection lens 105 passes through the transparent cover 103 and illuminates the front of the fog lamp 101.

As shown in FIGS. 20 and 21, the fog lamp 101 includes an adjustment mechanism 110. The adjustment mechanism 110 has a head part 110a and a shaft part 110b. As shown in FIG. 21, the head part 110a is arranged below the plurality of heat radiation plates 102c on the backside of the back plate 102a of the housing 102. That is, the head part 110a is arranged outside the housing 102. The head part 110a is configured to be rotatably operated by a predetermined tool. The shaft part 110b extends into the lamp chamber 104 through the back plate 102a. An outer peripheral surface of the shaft part 110b is formed with a screw groove.

As shown in FIG. 22, the first support member 106 has a coupling part 106d and a joint 106e. The coupling part 106d is formed integrally with a lower part of the first support member 106 and extends downwards from the lower part. The joint 106e is mounted to the coupling part 106d. The joint 106e is formed with a through-hole 106e1. An inner peripheral surface of the through-hole 106e1 is formed with a screw groove.

As shown in FIG. 18, the shaft part 110b of the adjustment mechanism 110 is inserted into the through-hole 106e1 of the joint 106e. At this time, the screw groove formed on the outer peripheral surface of the shaft part 110b and the screw groove formed on the inner peripheral surface of the through-hole 106e1 are screwed. When the head part 110a of the adjustment mechanism 110 is rotated by the predetermined tool, a screwing position of the shaft part 110b and the joint 106e is changed and the joint 106e is displaced in the front and rear direction.

Figure 24A:
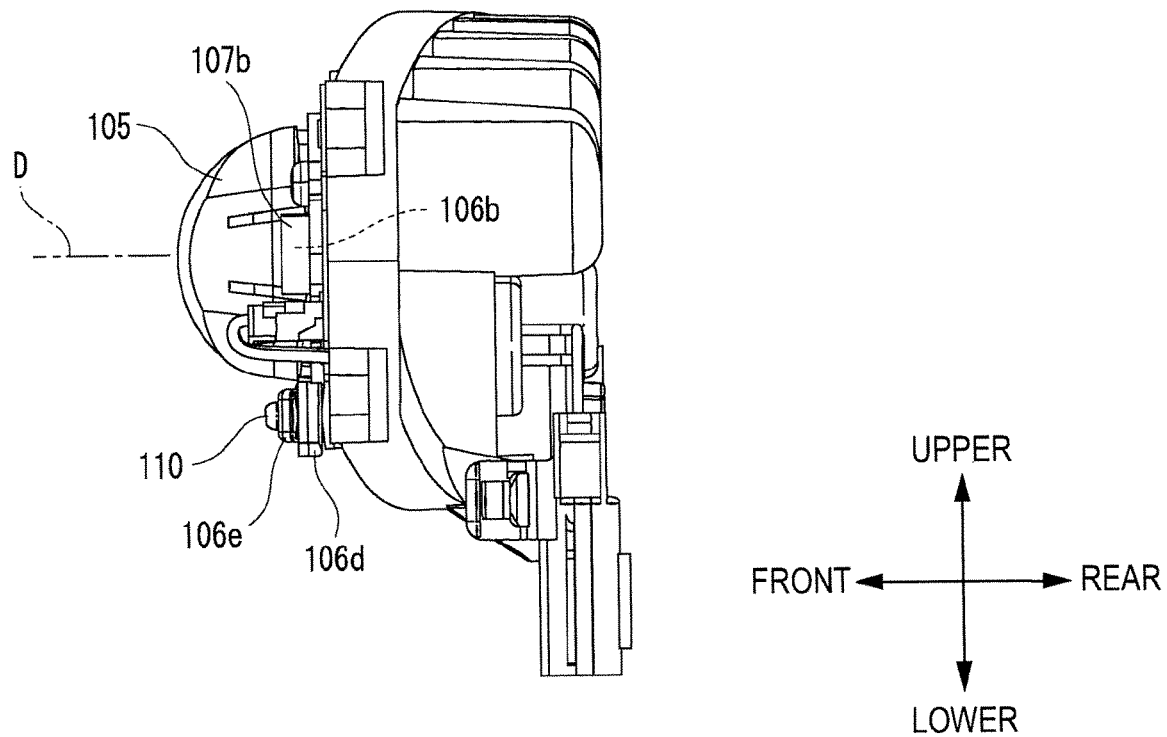
FIG. 24A is a left side view illustrating an operation of an adjustment mechanism of the fog lamp of FIG. 15.
Figure 24B:
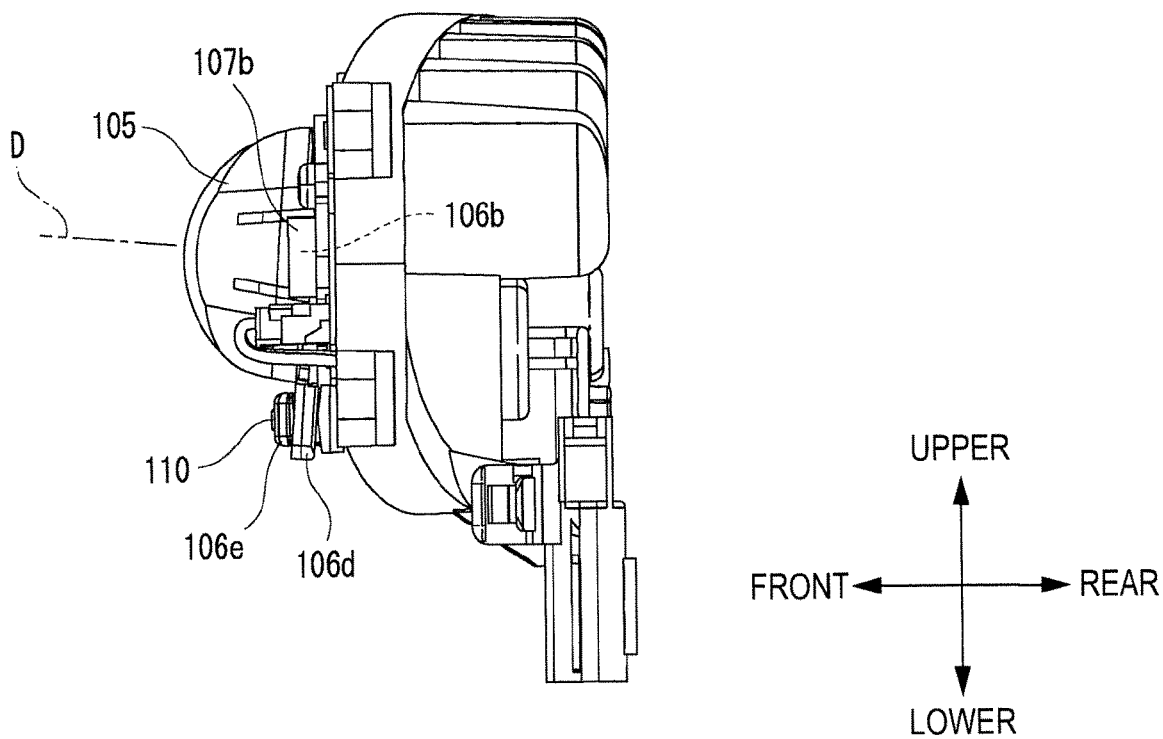
FIG. 24B is a left side view illustrating the operation of the adjustment mechanism of the fog lamp of FIG. 15.
Figure 24C:
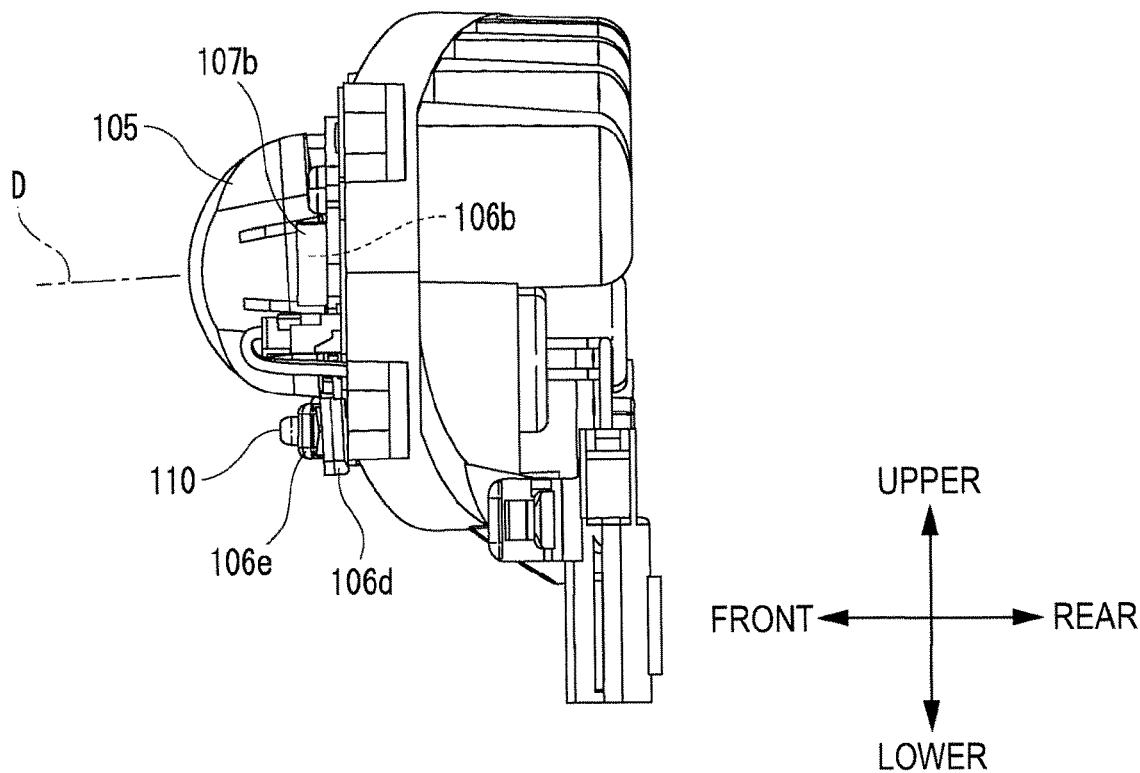
FIG. 24C is a left side view illustrating the operation of the adjustment mechanism of the fog lamp of FIG. 15.

FIGS. 24A to 24C are left side views for illustrating movement of the projection lens 105 in association with rotation of the adjustment mechanism 110. FIG. 24A depicts an initial state.

When the head part 110a of the adjustment mechanism 110 is rotated in a counterclockwise direction from the initial state, the joint 106e is displaced forwards. In association with this, the coupling part 106d of the first support member 106 is pushed forwards. At this time, the right shaft part 106a and the left shaft part 106b of the first support member 106 are respectively rotated in the right shaft holding part 107a and the left shaft holding part 107b of the second support member 107, in the clockwise direction as seen from left. Since the projection lens 105 is supported to the first support member 106, the optical axis D of the projection lens 105 is inclined upwards, as shown in FIG. 24B.

On the other hand, when the head part 110a of the adjustment mechanism 110 is rotated in the clockwise direction, the joint 106e is displaced rearwards. In association with this, the coupling part 106d of the first support member 106 is pulled rearwards. At this time, the right shaft part 106a and the left shaft part 106b of the first support member 106 are respectively rotated in the right shaft holding part 107a and the left shaft holding part 107b of the second support member 107, in the counterclockwise direction as seen from left. Since the projection lens 105 is supported to the first support member 106, the optical axis D of the projection lens 105 is inclined downwards, as shown in FIG. 24C.

That is, when the head part 110a of the adjustment mechanism 110 is rotated, the shaft part 110b is rotated and the rotation of the shaft part 110b is converted into a force of rotating the first support member 106 by the joint 106e. Thereby, it is possible to adjust a reference position in the upper and lower direction of the optical axis D of the projection lens 105 by rotating the adjustment mechanism 110.

In order to change the reference position of the optical axis D of the projection lens 105, it is required to finally change a position or a posture of the projection lens 105. As an example of a configuration enabling the change, a configuration is considered in which a shaft part is provided for the projection lens 105 and a shaft holding part configured to allow the shaft part to rotate is provided for the first support member 106. Since the projection lens 105 is a smaller and lighter component than the housing 102, it is possible to effectively change a posture of the projection lens 105 while avoiding enlargement of a mechanism relating to the optical axis adjustment.

In this case, however, as the projection lens 105 is rotated, a relative position between the optical axis D of the projection lens 105 and the reflector 106c is changed. The inventors found out that the change in the relative position between the optical axis D of the projection lens 105 and the reflector 106c may cause a distortion at a peripheral edge portion of a light distribution pattern to be formed.

According to the configuration of this embodiment, the right shaft part 106a and the left shaft part 106b are provided for the first support member 106 configured to support the projection lens 105, and the right shaft holding part 107a and the left shaft holding part 107b are provided for the second support member 107 configured to support the first support member 106. A member to rotate is the first support member 106 configured to support the projection lens 105, which is a smaller and lighter component than the housing 102. Therefore, also in this case, it is possible to suppress enlargement of the adjustment mechanism 110. Thereby, it is possible to suppress the enlargement of the fog lamp 101 while providing the projection lens 105 and the adjustment mechanism 110 configured to adjust the optical axis of the projection lens. Also, since the reflector 106c is displaced to follow the optical axis D of the projection lens 105 to be displaced in correspondence to the operation of the adjustment mechanism 110, the relative position between the reflector and the optical axis is not changed. Therefore, it is possible to suppress a distortion of the light distribution pattern to be formed.

In the meantime, the adjustment mechanism 110 is not necessarily required to have the screw aspect that can be operated from the outside of the housing 102. For example, a configuration may be adopted in which an actuator coupled to the first support member 106 is provided in the lamp chamber 104 and the first support member 106 is enabled to rotate relative to the second support member 107 by the actuator. In this case, a signal for controlling the actuator may be input through the wiring unit 109.

As shown in FIG. 22, in this embodiment, the joint 106e is formed separately from the first support member 106 and is mounted to the coupling part 106d. However, the joint 106e may be formed as a part of the first support member 106. In this case, it is possible to reduce the number of components. When the coupling part 106d and the joint 106e are configured as separate members, like this embodiment, it is possible to improve the forming easiness of each member.

As can be clearly seen from FIGS. 19 and 20, the driving circuit board 108d having the light source driving circuit is arranged in a space in which the adjustment mechanism 110 extends in the lamp chamber 104.

According to the above configuration, it is possible to suppress the enlargement of the housing 102 by effectively utilizing the space that is required as the adjustment mechanism 110 is provided. Therefore, it is possible to further suppress the enlargement of the fog lamp 101 while providing the projection lens 105 and the adjustment mechanism 110 configured to adjust the optical axis of the projection lens.

Particularly, in this embodiment, the driving circuit board 108d is arranged so that a main surface is to face the adjustment mechanism 110.

According to the above configuration, it is possible to particularly reduce a size of the housing 102 in the upper and lower direction. In general, it is strongly needed to miniaturize the fog lamp 101 in the upper and lower direction, rather than in the front and rear direction. Therefore, it is possible to meet the need for miniaturization while providing the projection lens 105 and the adjustment mechanism 110 configured to adjust the optical axis of the projection lens.

Figure 25A:
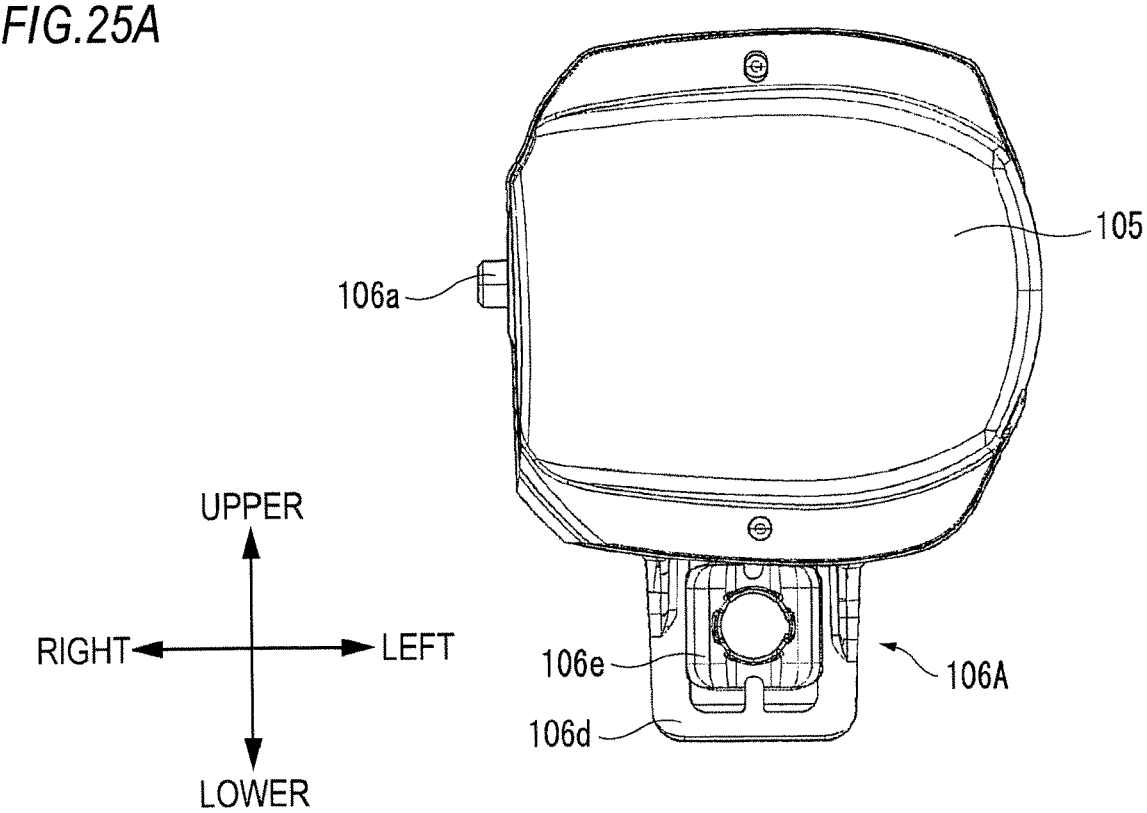
FIG. 25A depicts a modified embodiment of the first support member.
Figure 25B:
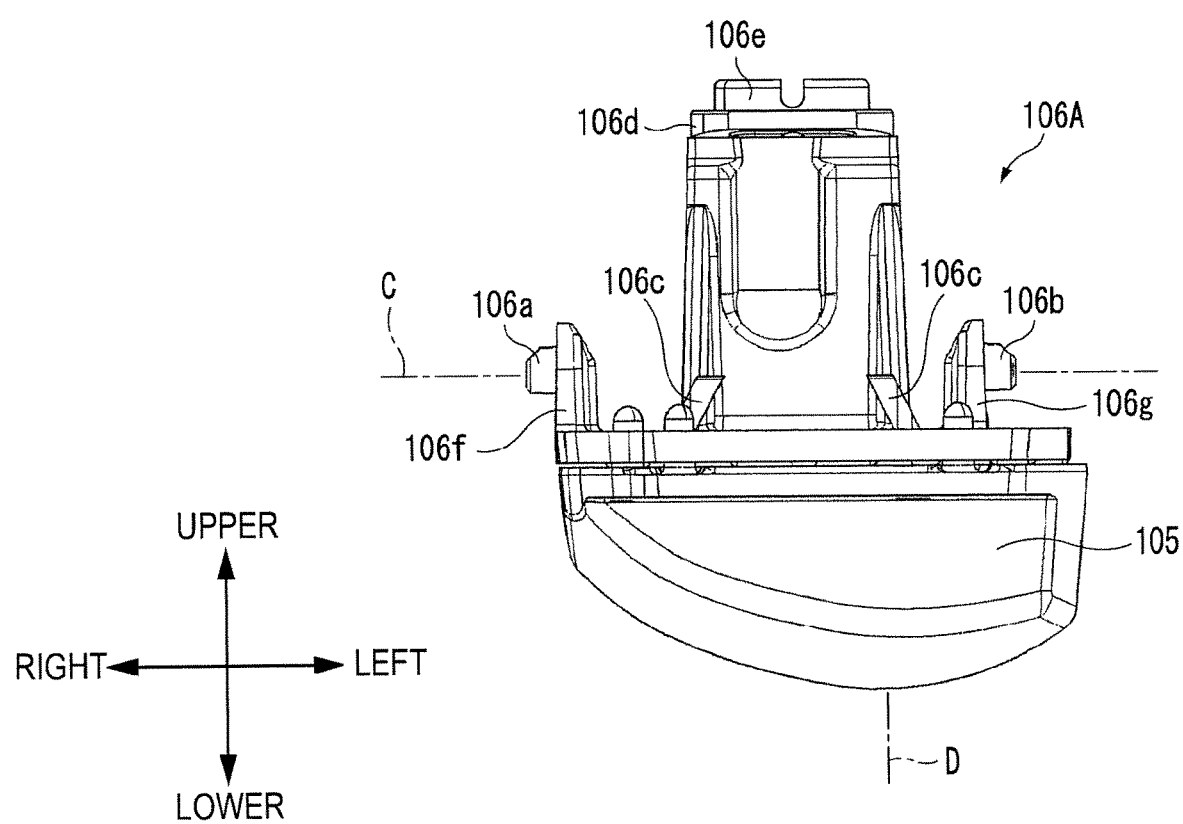
FIG. 25B depicts a modified embodiment of the first support member.

FIG. 25A is a font view depicting a first support member 106A of a modified embodiment. FIG. 25B is a top view depicting the first support member 106A. The elements having substantially the same functions as the first support member 106 of the above embodiment are denoted with the same reference numerals.

The first support member 106A has a right arm part 106f and a left arm part 106g. The right arm part 106f extends rearwards from a right side part of the first support member 106A. A right shaft part 106a (an example of the first shaft part) extends rightwards from a rear end portion of the right arm part 106f. The left arm part 106g extends rearwards from a left side part of the first support member 106A. A left shaft part 106b (an example of the second shaft part) extends leftwards from a rear end portion of the left arm part 106g.

As can be clearly seen from FIGS. 25A and 25B, the left shaft part 106b of the first support member 106A is arranged inside of an outward shape of the projection lens 105, when the projection lens 105 is seen from a direction along the optical axis D.

Figure 26:
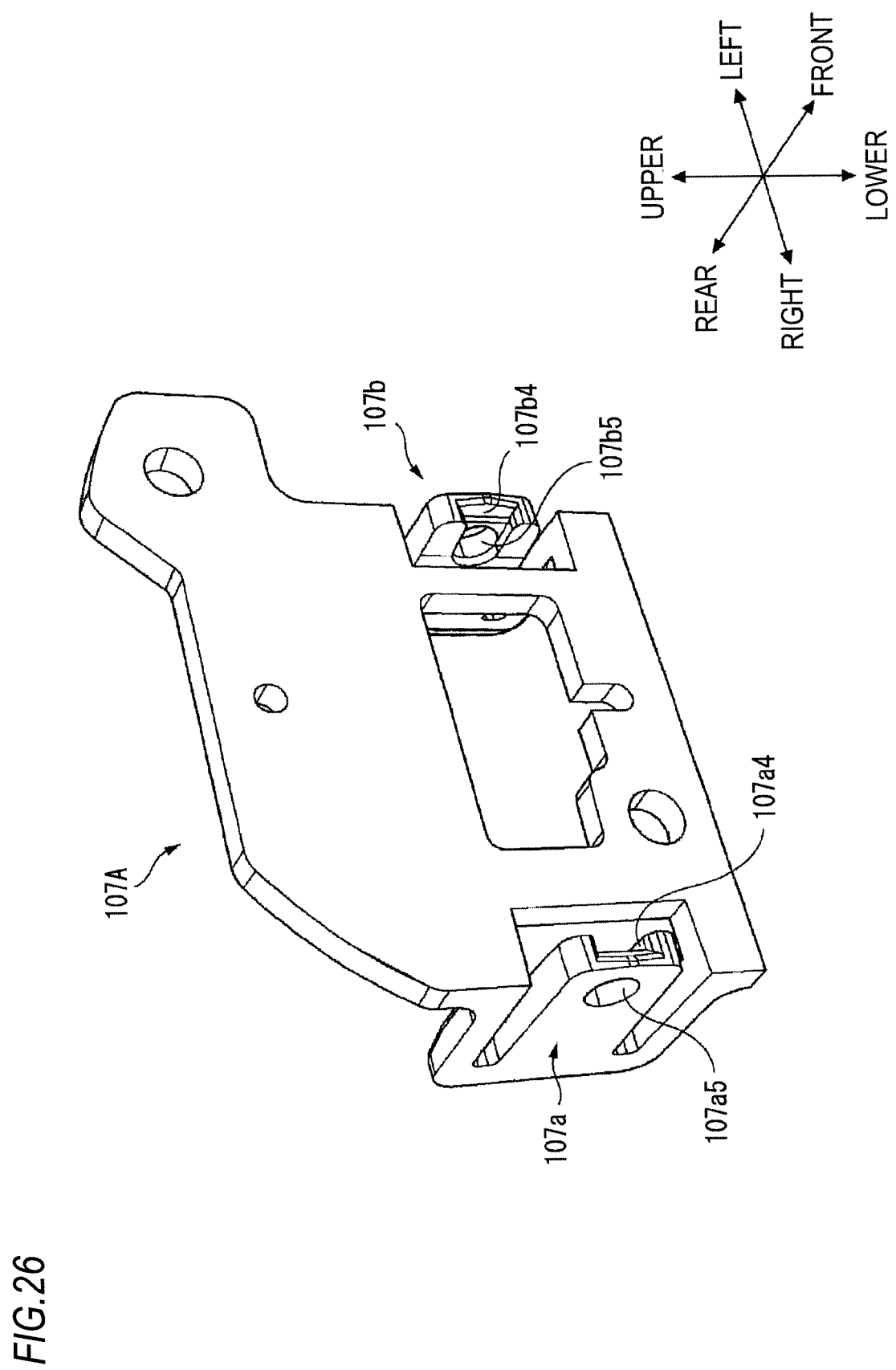
FIG. 26 depicts a modified embodiment of the second support member.

FIG. 26 is a font view depicting a second support member 107A of a modified embodiment, as seen from a right upper front side. The elements having substantially the same functions as the second support member 107 of the above embodiment are denoted with the same reference numerals.

The second support member 107A has a right shaft holding part 107a (an example of the first shaft holding part) and a left shaft holding part 107b (an example of the second shaft holding part). The right shaft holding part 107a has a right engaging groove 107a4 and a right engaging hole 107a5. The right engaging groove 107a4 extends in the front and rear direction and a front end thereof opens. The right engaging hole 107a5 is a through-hole formed at a rear end portion of the right engaging groove 107a4 and extending in the right and left direction. The left shaft holding part 107b has a left engaging groove 107b4 and a left engaging hole 107b5. The left engaging groove 107b4 extends in the front and rear direction and a front end thereof opens. The left engaging hole 107b5 is a through-hole formed at a rear end portion of the left engaging groove 107b4 and extending in the right and left direction. The right engaging groove 107a4 and the left engaging groove 107b4 are configured to face each other. A distance between a bottom surface of the right engaging groove 107a4 and a bottom surface of the left engaging groove 107b4 is shorter than a distance between a tip end of the right shaft part 106a and a tip end of the left shaft part 106b of the first support member 106A.

Figure 27A:
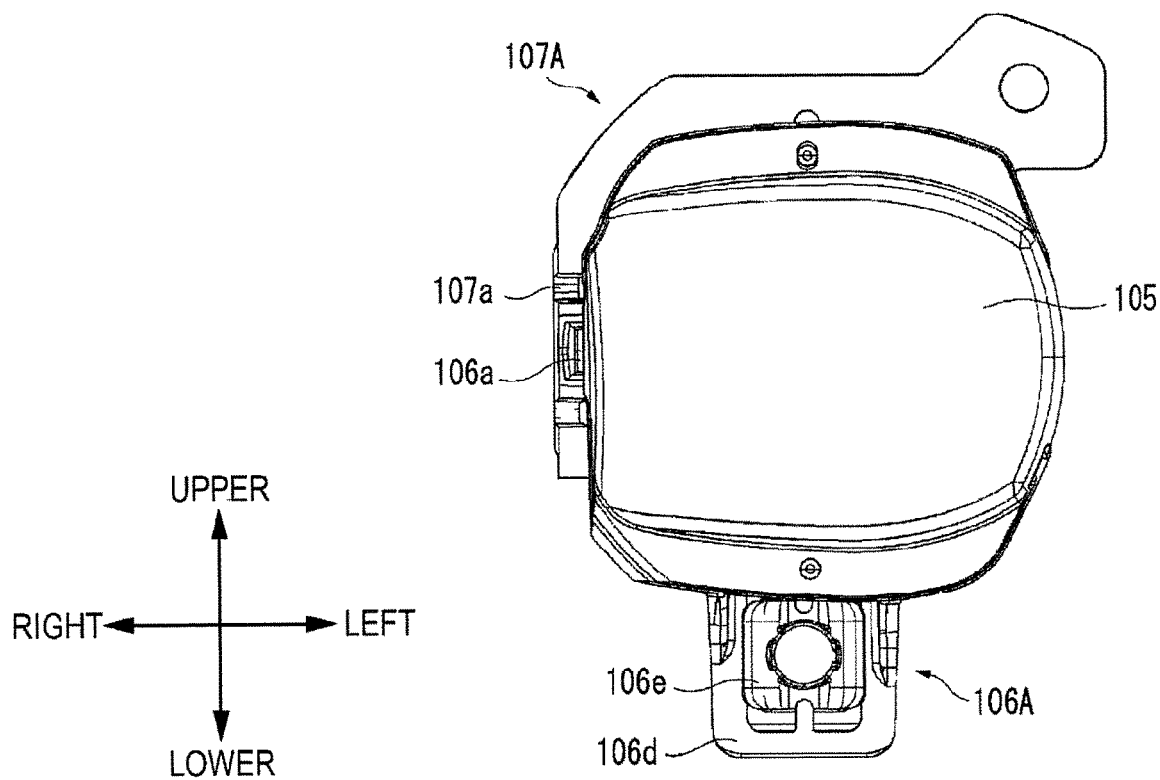
FIG. 27A depicts a coupled state of the first support member and the second support member in a modified embodiment.
Figure 27B:
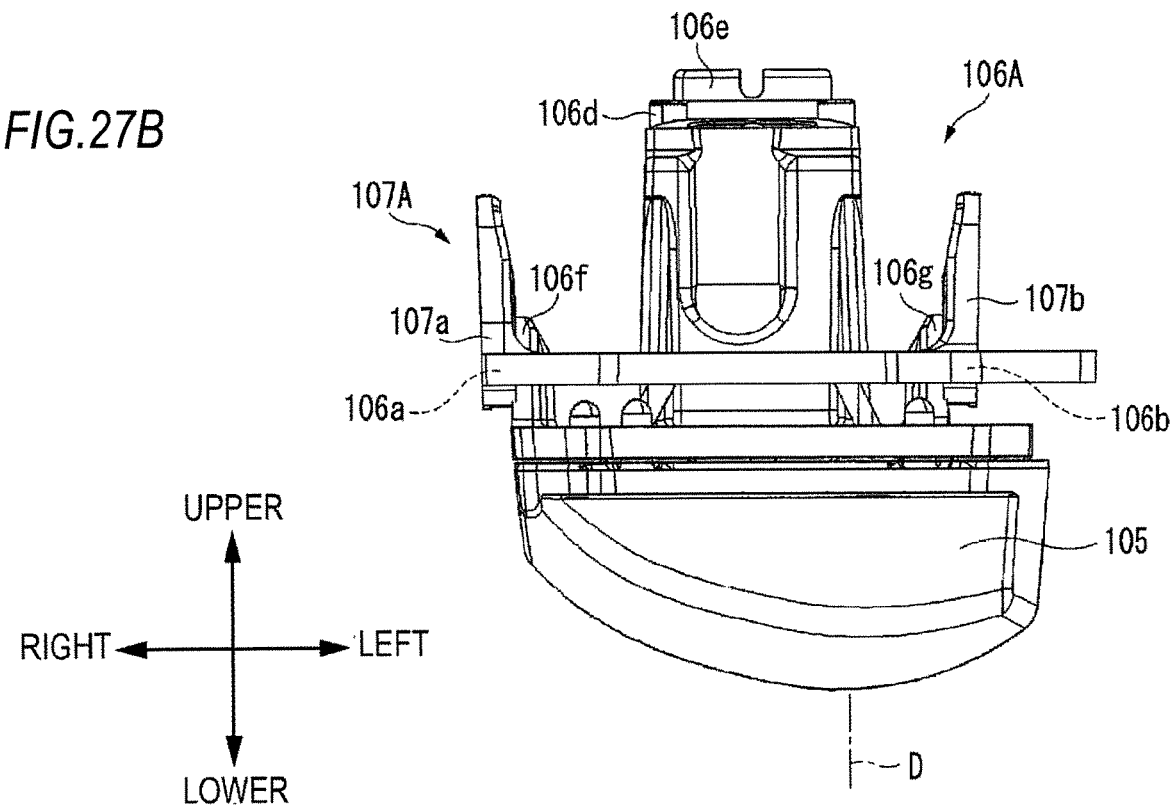
FIG. 27B depicts a coupled state of the first support member and the second support member in a modified embodiment.

The first support member 106A and the second support member 107A having the above configuration are coupled as shown in FIGS. 27A and 27B. FIG. 27A is a front view and FIG. 27B is a top view. The right shaft part 106a and the left shaft part 106b of the first support member 106A are respectively inserted from a front end of the right engaging groove 107a4 and a front end of the left engaging groove 107b4 of the second support member 107A. By the above-described size relation, the right arm part 106f and the left arm part 106g of the first support member 106A are bent inwards to come close to each other. At this state, when the right shaft part 106a and the left shaft part 106b are pushed to rear ends of the right engaging groove 107a4 and the left engaging groove 107b4, the right arm part 106f and the left arm part 106g return to original shapes thereof, and the right shaft part 106a and the left shaft part 106b are respectively engaged with the right engaging hole 107a5 and the left engaging hole 107b5. Thereby, the right shaft part 106a and the left shaft part 106b of the first support member 106A are held to be rotatable about the axis line C by the right shaft holding part 107a and the left shaft holding part 107b of the second support member 107A.

As can be clearly seen from FIGS. 27A and 27B, the left shaft holding part 107b of the second support member 107A is arranged inside the outward shape of the projection lens 105, when the projection lens 105 is seen from a direction along the optical axis D.

According to the above configuration, it is possible to further suppress the enlargement of the fog lamp 101 in the direction along the optical axis D, particularly.

In this modified embodiment, both the left shaft part 106b of the first support member 106A and the left shaft holding part 107b of the second support member 107A, which form a combination (an example of the second combination), are arranged inside the outward shape of the projection lens 105, when the projection lens 105 is seen from a direction along the optical axis D. However, a configuration is also possible in which only one (the left shaft part 106b located at the inner side, in this example) of the left shaft part 106b and the left shaft holding part 107b forming the combination is arranged inside the outward shape of the projection lens 105, when the projection lens 105 is seen from a direction along the optical axis D.

The above is also the same for a combination (an example of the first combination) of the right shaft part 106a of the first support member 106A and the right shaft holding part 107a of the second support member 107A. In addition to the above configuration, or alternatively, a configuration is also possible in which at least one of the right shaft part 106a and the right shaft holding part 107a forming the combination is arranged inside the outward shape of the projection lens 105, when the projection lens 105 is seen from a direction along the optical axis D.

The embodiments are just exemplary so as to easily understand the present invention. The configurations of the embodiments can be appropriately changed and improved without departing from the gist of the present invention. Also, it is obvious that equivalents are to be included within the technical scope of the present invention.

In the first embodiment, the right shaft part 51 and the left shaft part 52 are provided for the projection lens 5, and the right shaft holding part 61 and the left shaft holding part 62 are provided for the lens holder 6. To the contrary, the lens holder 6 may be provided with the right shaft part and the left shaft part and the projection lens 5 may be provided with the right shaft holding part and the left shaft holding part.

In the first embodiment, the adjustment mechanism 9 has the screw having the head part 91 and the shaft part 92. The shaft part 92 extends through the back plate 21 (an example of the part of the housing) of the housing 2. According to the above configuration, it is possible to arrange the adjustment mechanism 9 by effectively utilizing the empty space in the lamp chamber 4 defined by the housing 2. Therefore, it is possible to further meet the need for miniaturization of the fog lamp 1 while providing the projection lens 5 and the mechanism configured to adjust the optical axis of the projection lens.

However, the adjustment mechanism 9 may have an actuator arranged in the lamp chamber 4 and coupled to the projection lens 5, instead of the screw. In this case, the projection lens 5 is enabled to rotate relative to the lens holder 6 by an operation of the actuator. A signal for controlling the actuator may be input through the connector unit 8.

In the first embodiment, as shown in FIG. 13, the joint 54 is formed separately from the projection lens 5 and is mounted to the coupling part 53. However, the joint 54 may be integrally formed as a part of the projection lens 5. In this case, it is possible to reduce the number of components. When the coupling part 53 and the joint 54 are configured as separate members, like the embodiment, it is possible to improve the forming easiness of each member.

In the second embodiment, the right shaft part 106a and the left shaft part 106b are provided for the first support member 106, and the right shaft holding part 107a and the left shaft holding part 107b are provided for the second support member 107. To the contrary, the first support member 106 may be provided with the right shaft holding part and the left shaft holding part, and the second support member 107 may be provided with the right shaft part and the left shaft part.

In the second embodiment, the first support member 106 has the pair of reflectors 106c. However, the number, shape and arrangement of the reflectors 106c can be appropriately determined depending on the specification of the fog lamp 101.

In the second embodiment, the light output surface of the light source 108b is arranged to face the projection lens 105. According to the above configuration, it is possible to shorten a distance between the light source 108b and the projection lens 105. However, from a standpoint of a degree of layout freedom of an optical system, a direction of the light output surface of the light source 108b can be appropriately determined depending on the specification.

In the respective embodiments, the fog lamp has been exemplified as the lighting device. However, the present invention can also be applied to a variety of lighting devices in which the projection lens is provided in the lamp chamber defined by the housing and the transparent cover and the optical axis of the projection lens is required to be adjusted.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A lighting device that is to be mounted on a vehicle, the lighting device comprising:
    a light source;
    a control circuit configured to control the light source to turn on and off;
    a substrate configured to support the light source and the control circuit;
    a housing configured to couple with a transparent cover, through which light emitted from the light source is to pass, and to support the substrate and having a back plate, a support table disposed at a front of the back plate, and a through-hole formed in the back plate;
    a power feeding connector having a first part arranged outside the housing and a second part of which at least a part is arranged in the through-hole; and
    a terminal held at the second part, coupled to the substrate and electrically connected to the control circuit,
    a projection lens configured to enable at least a part of the light emitted from the light source to pass therethrough, and
    a holder configured to hold the projection lens, a position of the holder relative to the light source being fixed,
    wherein the substrate is mounted on a front surface of the support table,
    wherein the holder comprises a first shaft holding element and a second shaft holding element disposed on a front surface of the holder,
    wherein the first shaft holding element comprises a first peripheral wall of a semi-circular arc shape, and the second shaft holding element comprises a second peripheral wall of the semi-circular arc shape, and
    wherein the semi-circular arc shape of the first peripheral wall opens toward the semi-circular arc shape of the second peripheral wall.

2. The lighting device according to claim 1, further comprising:
    a shaft part disposed on one of the projection lens and the holder and extending in a direction intersecting with an optical axis of the projection lens,
    and
    an adjustment mechanism configured to rotate the projection lens relative to the holder about the shaft part, and
    wherein one of the first shaft holding element and the second shaft holding element is disposed on the other of the projection lens and the holder and is configured to rotatably hold the shaft part.

3. The lighting device according to claim 2,
    wherein the adjustment mechanism comprises:
    a screw of which a part is configured to be rotatably operated outside the housing, and
    a joint configured to convert rotation of the screw into a force for rotating the projection lens about the shaft part, and
    wherein the screw extends through a part of the housing.

4. The lighting device according to claim 1,
    wherein the housing is a one-piece metal member having a plurality of heat radiation plates integrally formed thereto, and
    wherein the housing has a ventilation part configured to communicate with a lamp chamber.

5. The lighting device according to claim 1,
    wherein a part of the power feeding connector is mechanically fastened to the substrate.

6. The lighting device according to claim 1, comprising a sealing member arranged between the second part and an inner wall of the through-hole.

7. The lighting device according to claim 1,
    wherein an inner wall of the through-hole is inclined relative to a direction in which the through-hole extends.

8. The lighting device according to claim 1, wherein the housing is thermally conductive.

9. The lighting device according to claim 1, wherein the substrate is formed with a terminal hole, and the conductive terminal is inserted into the terminal hole.

\* \* \* \* \*